United States Patent [19]

Ueki et al.

[11] Patent Number: 4,867,375
[45] Date of Patent: Sep. 19, 1989

[54] TEMPERATURE-ADJUSTABLE WATER SUPPLY SYSTEM

[75] Inventors: Kouichi Ueki, Nara; Hiroshi Fujieda, Kashihara, both of Japan

[73] Assignee: Matsushita Electric Industrial Co., Ltd., Japan

[21] Appl. No.: 207,135

[22] Filed: Jun. 14, 1988

[30] Foreign Application Priority Data

Dec. 17, 1987 [JP] Japan .................. 62-319434

[51] Int. Cl.$^4$ ........................... G05D 23/185
[52] U.S. Cl. .................. 236/12.12; 236/78 D; 364/163; 364/502
[58] Field of Search ............ 236/12.12, 78 D; 364/163, 502; 137/88

[56] References Cited

U.S. PATENT DOCUMENTS

| 3,925,640 | 12/1975 | Duggan | 364/163 |
| 4,359,186 | 11/1982 | Kiendl | 137/88 X |
| 4,711,392 | 12/1987 | Kidouchi et al. | 236/12.12 |
| 4,739,923 | 4/1988 | Tsutsui et al. | 236/12.12 |

FOREIGN PATENT DOCUMENTS 61-112879  5/1986  Japan .

Primary Examiner—William E. Wayner
Attorney, Agent, or Firm—Lowe, Price, Leblanc, Becker & Shur

[57] ABSTRACT

A temperature-adjustable water supply system used for supplying an appropriate temperature water to a water-using object. The system comprises a mixing device coupled to a hot water supply passage and a cold water supply passage for respectively introducing hot water and cold water thereinto and coupled to a water mixture supply passage for supplying the mixture of the hot water and cold water toward said water-using object. The mixing device includes a flow rate adjusting valve assembly for adjusting the mixture ratio of the hot water and the cold water discharged into the water mixture supply passage. A temperature sensor is provided so as to sense the temperature of the water mixture and a temperature setter for setting a target temperature. Also included in the system is a control unit which calculates a temperature deviation on the basis of the temperature of the mixture sensed by the temperature sensor and the target temperature set by the temperature setter. The control unit determines a control amount to the flow rate adjusting valve assembly on the basis of the calculated temperature deviation so as to provide an appropriate mixture ratio of the hot water and the cold water.

17 Claims, 25 Drawing Sheets

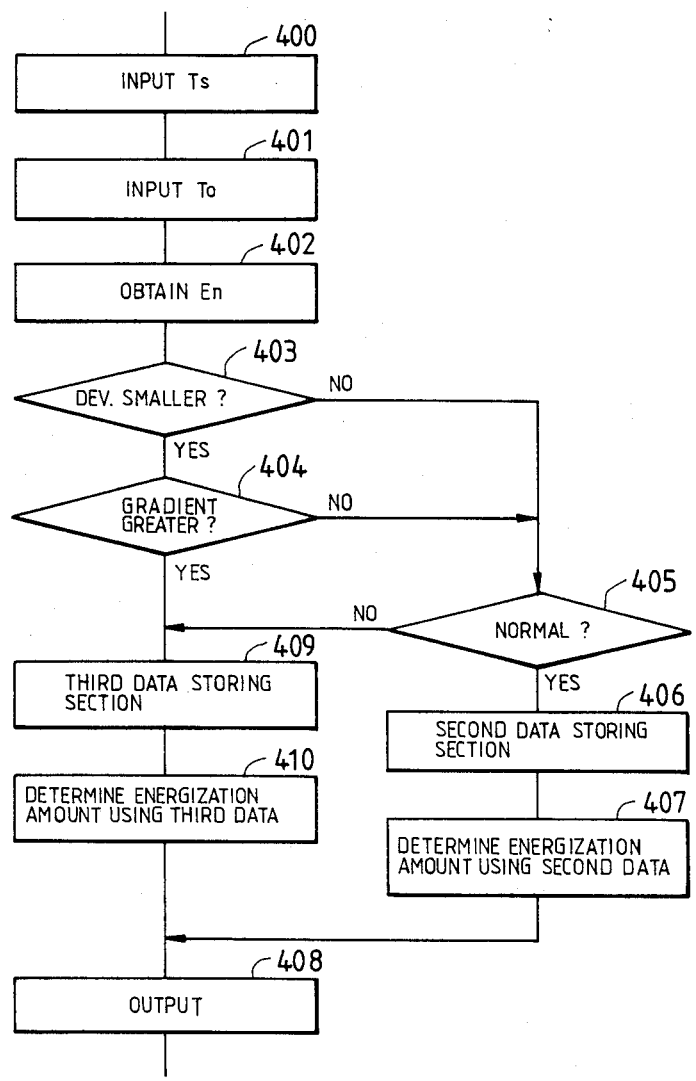

TEMPERATURE-ADJUSTABLE WATER SUPPLY SYSTEM

BACKGROUND OF THE INVENTION

The present invention relates generally to a temperature-adjustable water supply system, and more particularly to a system for supplying water appropriately adjusted in terms of temperature in accordance with intended use, e.g. as bath or shower water.

Japanese Patent Provisional Publication No. 61-112879 discloses an attempt to adjust the temperature of water to be supplied to a water-using object such as shower nozzle, the technique being arranged such that the mixing ratio between hot water and cold water is directly controlled in connection with the opening degrees of a hot-water flow-rate control valve and a cold-water flow-rate control valve which are provided in a hot-water supply passage and a cold-water supply passage, respectively. More specifically, hot water and cold water separately flow through hot-water supply passage and cold-water supply passage, respectively, and mix at a predetermined junction point to further flow through a mixture-water supply passage in a mixed condition. The hot-water supply passage and cold-water supply passage have a hot-water flow-rate control valve and a cold-water flow-rate control valve, respectively, upstream from the predetermined junction point connected to the mixture-water supply passage which is in turn coupled to a water-using object. The temperature of the resulting water mixture is monitored by means of a temperature sensor which is provided in the mixture-water supply passage. A signal indicative of the temperature of the water mixture from the temperature sensor is supplied to a control unit which in turn performs feedback control so that the opening degrees of the hot-water flow-rate valve and cold-water flow-rate valve are respectively adjusted in accordance with the difference between the temperature of the water mixture and a predetermined target temperature. An important problem in such a temperature-adjustable water supply system relates to the difficulty in quickly and stably supplying water at an appropriate temperature. That is, if the break between the water-using periods is relatively long, the temperature of the hot water in the hot-water supply passage is lowered to approximately ambient temperature and therefore the control unit rapidly increases the opening degree of the hot-water flow-rate valve in response to the signal from the temperature sensor of the water-mixture supply passage. This may result in the fact that the temperature of the water mixture to be supplied through the water-mixture supply passage overshooting the predetermined target temperature. Furthermore, in the prior technique, the opening and closing speed of the hot-water and cold-water flow-rate valves is controlled proportionally in accordance with the difference between the water-mixture temperature and the predetermined target temperature. This provides another problem, however, that the temperature of the water mixture easily repeatedly overshoots and undershoots with respect to the predetermined target temperature, resulting in the difficulty being encountered to quickly control the water-mixture temperature so as to be coincident with the target temperature.

SUMMARY OF THE INVENTION

The present invention has been developed in order to remove the above-mentioned drawbacks inherent to conventional temperature-adjustable water supply systems.

It is therefore an object of the present invention to provide a temperature-adjustable water supply system which is capable of quickly and stably supplying water of an appropriate temperature to a water-using object.

In accordance with the present invention, there is provided a temperature-adjustable water supply system for supplying an appropriate temperature water to a water-using object (i.e, water outlet), comprising: mixing means coupled to a hot water supply passage and a cold water supply passage for respectively introducing hot water and cold water thereinto and coupled to a water mixture supply passage for supplying the mixture of the hot water and cold water toward said water-using object, said mixing means including flow rate adjusting valve means for respectively adjusting the flow rates of the hot water and the cold water discharged into said water mixture supply passage, the temperature of the mixture of the hot water and cold water depending upon the ratio of the flow rates of the hot water and the cold water to be discharged thereinto and said flow rate adjusting valve means being operable in accordance with a control signal so as to change the ratio of the flow rates of the hot water and the cold water to be discharged thereinto; temperature sensor means provided in said water mixture supply passage so as to sense the temperature of the mixture of the hot water and the cold water and generate a signal indicative of the sensed mixture temperature; temperature setting means for setting a target temperature suitable for the purposes of said water-using object and generating a signal indicative of the set target temperature; and a control unit responsive to said mixture temperature signal from said temperature sensor means and said target temperature signal from said temperature setting means, said control unit comprising: deviation calculating means for calculating a temperature deviation on the basis of said temperature of the mixture sensed by said temperature sensor means and said target temperature set by said temperature setting means; comparing means for performing comparison between said sensed mixture temperature and said set target temperature; and valve control means for determining a control amount to said flow rate adjusting valve means on the basis of the temperature deviation calculated by said deviation calculating means and the relation in magnitude between said sensed mixture temperature and said set target temperature obtained by said comparing means and outputting said control signal indicative of said determined control amount to said mixing means so as to control the flow rates of the hot water and the cold water to be discharged into said water mixture supply passage.

Preferably, the valve control means includes first control data storing means and second control data storing means which respectively store control data used for determining said control amount on the basis of the calculated temperature deviation whereby the energization gain of the flow rate adjusting valve means is varied. More specifically, said valve control means includes normal-state detecting means coupled to said deviation calculating means so as to detect a first state in which the calculated temperature deviations is in a first predetermined range, said valve control means determines said control amount thereto using said control data stored in said first control data storing means in response to the detection of said first state so that said flow rate adjusting valve means is operated with a predetermined energization gain. Said valve control means further includes transient-state detecting means coupled to said deviation calculating means so as to detect a second state in which variation of the calculated temperature deviations is coincident with a predetermined condition, said valve control means determines said control amount thereto using said control data stored in said second control data storing means in response to the detection of said second state so that said flow rate adjusting valve means is operated with an energization gain greater than said predetermined energization gain. In addition, said normal-state detecting means is further coupled to said comparing means so as to detect a third state in which the sensed mixture temperature is below a predetermined value determined with respect to said set target temperature, said valve control means also determines said control amount thereto using said control data of said first control data storing means in response to the detection of said third state.

In accordance with the present invention, there is provided a temperature-adjustable water supply system for supplying an appropriate temperature water to a water-using object, comprising: mixing means coupled to a hot water supply passage and a cold water supply passage for respectively introducing hot water and cold water thereinto and coupled to a water mixture supply passage for supplying the mixture of the hot water and cold water toward said water-using object, said mixing means including flow rate adjusting valve means for respectively adjusting the flow rates of the hot water and the cold water discharged into said water mixture supply passage, the temperature of the mixture of the hot water and cold water depending upon the ratio of the flow rates of the hot water and the cold water to be discharged thereinto and said flow rate adjusting valve means being operable in accordance with a control signal so as to change the ratio of the flow rates of the hot water and the cold water to be discharged thereinto; temperature sensor means provided in said water mixture supply passage so as to sense the temperature of the mixture of the hot water and the cold water and generate a signal indicative of the sensed mixture temperature; temperature setting means for setting a target temperature suitable for the purposes of said water-using object and generating a signal indicative of the set target temperature; and a control unit responsive to said mixture temperature signal from said temperature sensor means and said target temperature signal from said temperature setting means, said control unit comprising: deviation calculating means for calculating a temperature deviation on the basis of said temperature of the mixture sensed by said temperature sensor means and said target temperature set by said temperature setting means; gradient detecting means coupled to said deviation calculating means for detecting the gradient of variation of the calculated temperature deviations; and valve control means for determining a control amount to said flow rate adjusting valve means on the basis of the detected gradient of variation of the calculated temperature deviation and outputting said control signal indicative of said determined control amount to said mixing means so as to control the flow rates of the hot water and the cold water to be discharged into said water mixture supply passage.

Preferably, said valve control means includes first control data storing means and second control data storing means which respectively store control data used for determining said control amount on the basis of the calculated temperature deviation whereby the energization gain of said flow-rate adjusting valve means is varied. More specifically, said valve control means includes gradient decision means coupled to said gradient detecting means to compare the detected variation gradient with a predetermined gradient, said valve control means determines said control amount thereto using said control data stored in said first control data storing means when the detected variation gradient is smaller than said predetermined gradient value. Said valve control means further includes deviation decision means coupled to said deviation calculating means so as to compare the calculated temperature deviation with a predetermined deviation value, said valve control means determines said control amount thereto using said control data stored in said first control data storing means when the calculated temperature deviation is greater than said predetermined deviation value and determines said control amount thereto using said control data stored in said second control storing means when the detected variation gradient is greater than said predetermined gradient value and the calculated temperature deviation is smaller than said predetermined deviation value.

BRIEF DESCRIPTION OF THE DRAWINGS

The object and features of the present invention will become more readily apparent from the following detailed description of the preferred embodiments taken in conjunction with the accompanying drawings in which:

FIG. 16 is a flow chart for describing the operation of the FIG. 16 control unit;

DETAILED DESCRIPTION OF THE INVENTION

Figure 1:
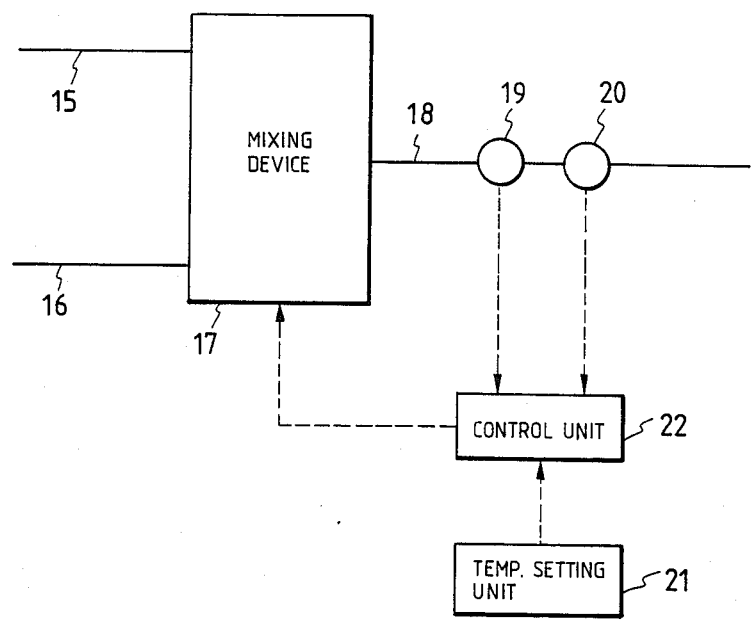
FIG. 1 is an illustration of a system of supplying appropriate-temperature water according to the present invention.

Referring now to FIG. 1, there is schematically illustrated a system for supplying temperature-adjusted water by means of the mixture of hot water and cold water according to the present invention. The temperature-adjustable water supply system includes a water mixing device 17 coupled to a hot-water supply passage 16 and a cold-water supply passage 15 so as to mix the incoming hot, or heated, water and the incoming cold, or environmental, water therethrough. The outgoing water mixture is supplied through a water-mixture supply passage 18 to a water-using object such as shower nozzle. The water-mixture supply passage 18 has a temperature sensor 19 for measuring the temperature of the water mixture flowing through the water-mixture supply passage 18 and a flow-rate detector 20 for measuring the flow rate of the water mixture in the water-mixture supply passage 18. Signals indicative of the measured water-mixture temperature and water-mixture flow rate from the temperature sensor 19 and the flow-rate detector 20 are coupled to a control unit 22 which controls the mixing device 17 so as to adjust the temperature of the water mixture to a target temperature which is reset by a temperature setting unit 21 which is also coupled to the control unit 22.

Figure 3:
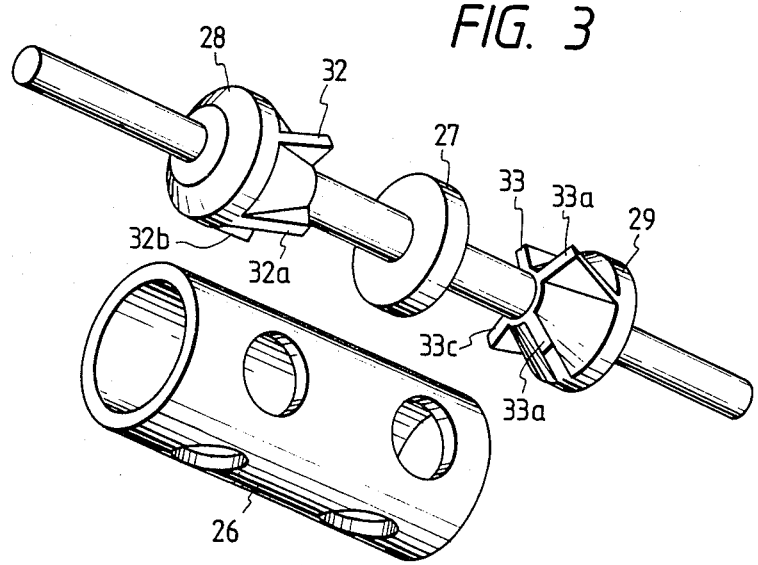
FIG. 3 is an exploded view showing the detailed arrangement of the pressure balancing valve assembly of the mixing device.
Figure 2:
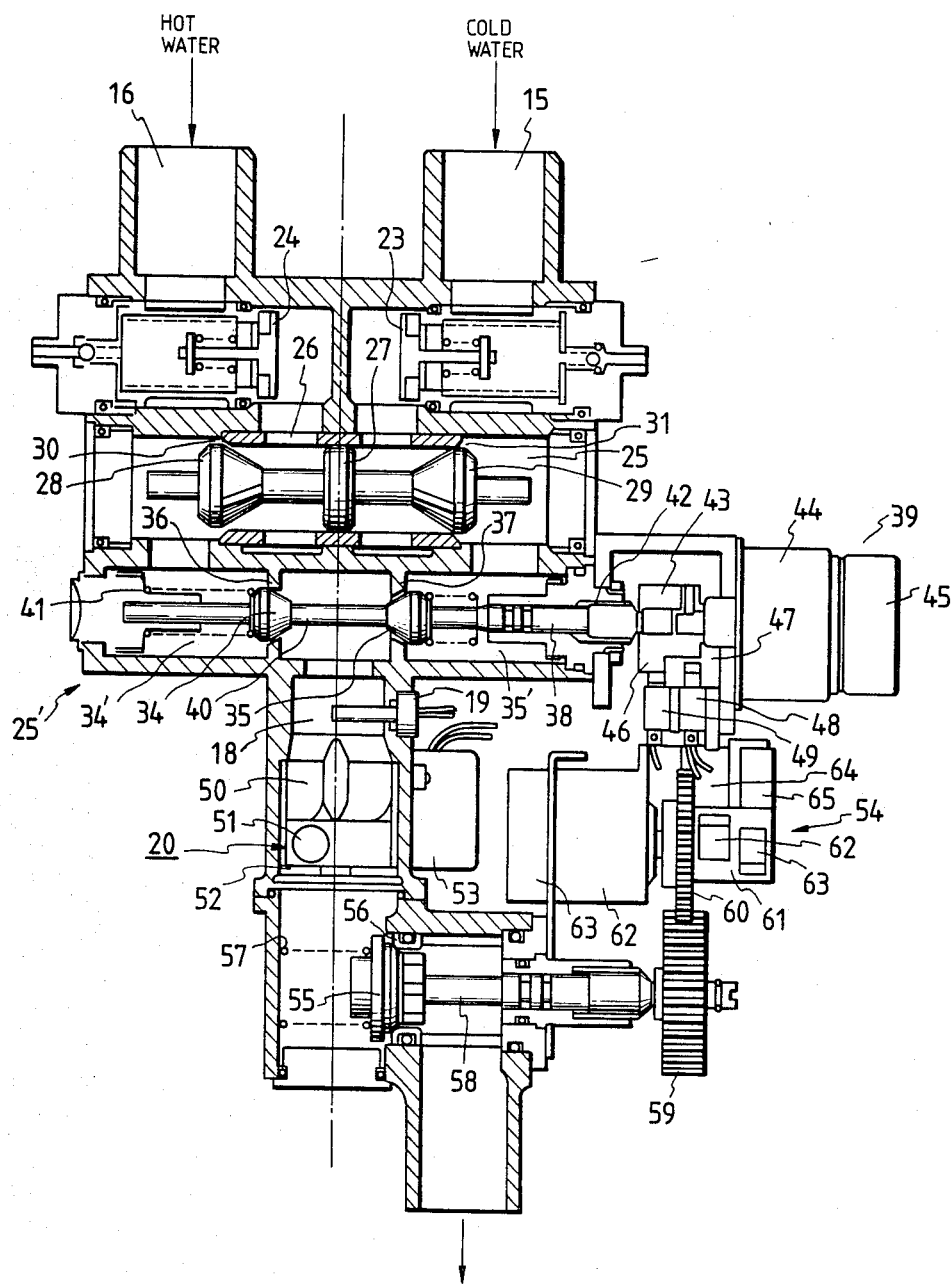
FIG. 2 shows one example of the arrangement of a water mixing device of the temperature-adjustable water supply system according to this invention.

FIG. 2 shows one example of the arrangement of the mixing device 17 of the temperature-adjustable water supply system according to this invention. In FIG. 2, the incoming cold water and incoming hot water from the cold-water supply passage 15 and hot-water supply passage 16 are introduced through cold-water side check valve 23 and hot-water side check valve 24 into a pressure balancing valve assembly 25. The pressure balancing valve assembly 25 comprises a cylinder 26 having inlet openings on its circumferential portions to introduce the cold water and hot water, a piston 27 located at the substantially the center portion in the cylinder 26 so as to prevent the introduced cold water and hot water from being mixed thereat, and a cold-water pressure-adjusting valve member 29 and a hot-water pressure-adjusting valve member 28 which are coaxially coupled to the piston 27. The pressures of the hot water and cold water in the cylinder 26 depend upon the gaps between the hot-water pressure-adjusting valve member 28 and one end portion (left side in the figure) of the cylinder 26 and between the cold-water pressure-adjusting valve member 29 and the other end portion (right side in the figure) of the cylinder 26. FIG. 3 shows the detailed arrangement of the pressure balancing valve assembly 25. As shown in FIG. 3, the hot-water valve pressure-adjusting member 28 and cold-water pressure-adjusting valve member 29 have blades 32, 32a, 32b and blades 33, 33a, 33b, 33c, each of which is provided obliquely, or at an angle, with respect to the axes of the pressure-adjusting valve members 28, 29. The maximum dimension between the blades is slightly smaller than the inner diameter of the cylinder 26.

Returning back to FIG. 2, the hot-water pressure-adjusting valve member 28 and cold-water pressure-adjusting valve member 29 of the pressure balancing valve assembly 25 move in accordance with the difference in pressure between the hot water and the cold water so as to balance the pressures of the hot water and the cold water. After balancing the hot water and the cold water enter through outlet openings of the pressure balancing valve assembly 25 into a hot-water side chamber 34' and a cold-water side chamber 35' of a water mixing valve assembly 25' provided at downstream of the pressure balancing valve assembly 25. The water mixing valve assembly 25' comprises a hot-water flow-rate adjusting valve member 34 and a cold-water flow-rate adjusting valve member 35 which are operatively coupled to each other through a drive shaft 38 one end portion of which comes into contact with the inner end portion 40 of the hot-water flow-rate adjusting valve member 34 and the other end portion of which is coupled operatively to a driving device 39 through a screw connection designated by numeral 42 so as to cause the drive shaft 38 to move in the directions along the axes of the flow-rate adjusting valve members 34 and 35. The cold-water flow-rate adjusting valve member 35 is slidably mounted on the drive shaft 38. The flow-rate adjusting valve members 34 and 35 are respectively tapered inwardly and disposed in opposed relation to each other and biased by means of spring members 41 toward the center of the mixing valve assembly 25'. The tapered portions of the flow-rate adjusting valve members 34 and 35 are respectively arranged so as to be in facing relation to hot-water side and cold-water side valve seats 36 and 37. The driving device 39 includes a cam 43, a reduction gear device 44 and a motor 45 and operates the drive shaft 38 so as to adjust the valve positions between the contact state of the flow-rate adjusting valve member 34 and the valve seat 36 and the contact state of the other flow-rate adjusting valve member 35 and the valve seat 37. The mixing ratio of the hot water and th cold water introduced from the hot-water side chamber 34' and the cold-water side chamber 35' depends upon the valve positions thereof set by the operation of the driving device 39 in accordance with a control signal from the control unit 22 of FIG. 1 which will be described hereinafter in detail. The hot-water shut-off state and the cold-water shut-off state are respectively detected with protruding portions 46 and 47 of the cam 43 coming into contact with microswitches 48 and 49.

After the adjustment of the mixing ratio of the hot water and cold water, the resultant water mixture is discharged therefrom into the water-mixture supply passage 18 to flow therethrough. As described above, the temperature sensor 19 and the flow-rate detector 20 are provided in the water-mixture supply passage 18. The flow-rate dector 20 includes an impeller 50 for rotating the flow of the water mixture, a magnetic ball member 51 adapted to be rotated in accordance with the rotation of the water mixture, a plate 52 for supporting the magnetic ball member 51, and a rotation detecting section 53 for detecting the rotation of the magnetic ball member 51. Further downstream of the water-mixture supply passage 18 is provided a flow-rate adjusting valve assembly 54 which comprises a valve seat 56, a valve member 55 for adjusting the flow rate of the water mixture in accordance with its position with respect to the valve seat 56, a spring 57 for urging the valve member 55, a first gear 59 connected through a shaft 58 to the valve member 55, a second gear engaged with the first gear 60, a cam 61 and reduction gear 62 coupled to the shaft of the second gear 60, and a motor 63 operatively coupled to the reduction gear 62. The flow-rate adjusting valve assembly 54 act to stop and supply the water mixture and adjusts the flow-rate of the water mixture. The water-mixture stopping state and full-opening state of the flow-rate adjusting valve assembly 54 are respectively detected with protruding portions 62 and 63 of the cam 61 coming into contact with microswitches 64 and 65.

Figure 4:
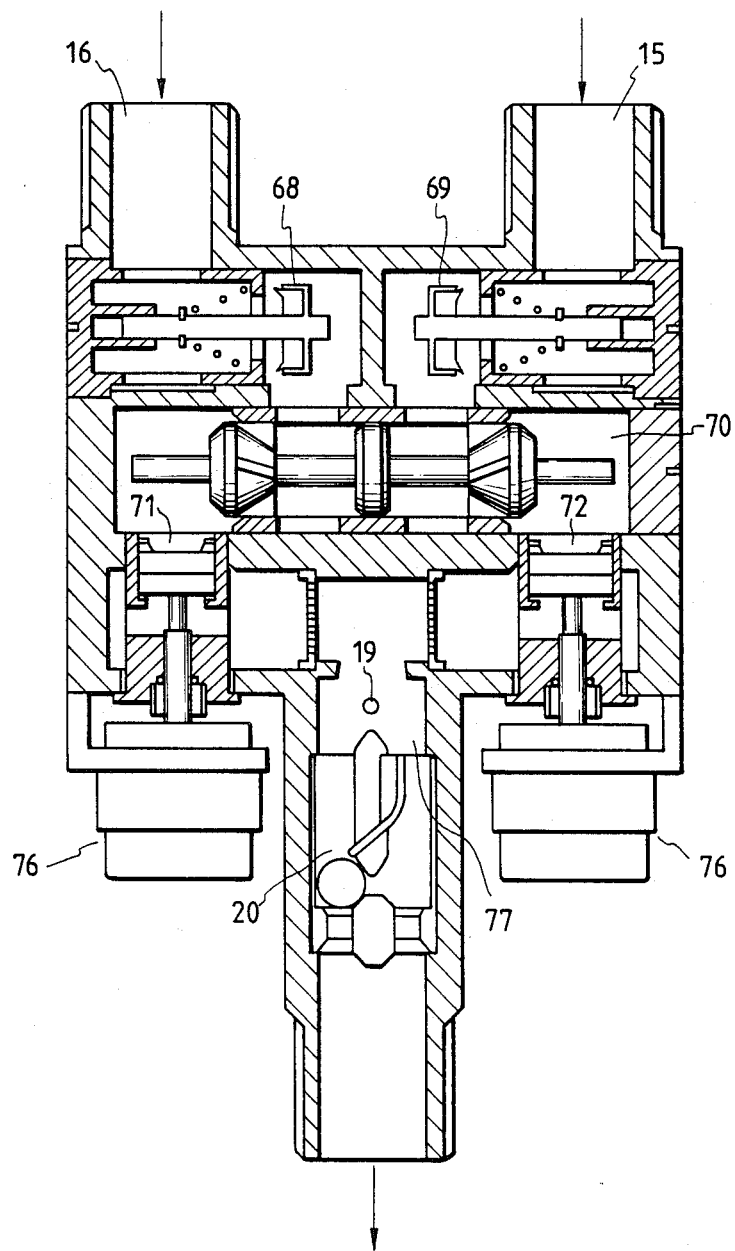
FIG. 4 is an illustration of a modification of the mixing device of the temperature-adjustable water supply apparatus according to this invention.
Figure 5:
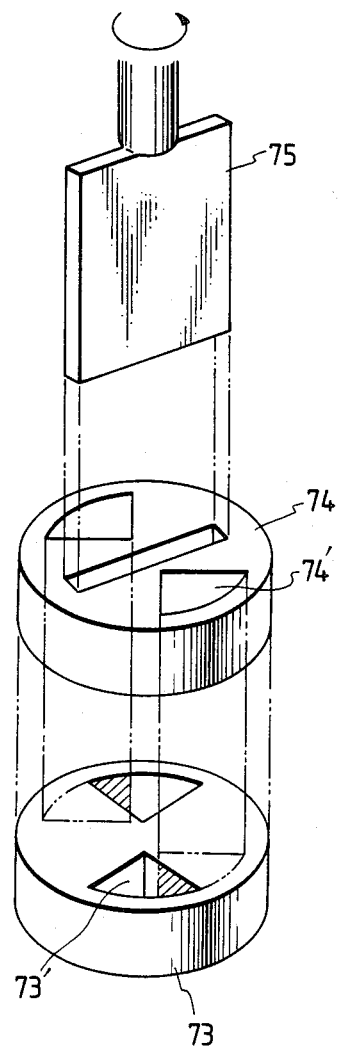
FIG. 5 shows a detailed arrangement of each of flow-rate adjusting valves of the FIG. 4 mixing device.

FIG. 4 is an illustration of a modification of the mixing device 17 of the temperature-adjustable water supply apparatus according to this invention, where the description of parts corresponding to those in FIG. 2 will be omitted for brevity. In FIG. 4, hot water and cold water are respectively supplied from a hot-water supply passage 16 and a cold-water supply passage 15 and introduced through hot-water side and cold-water side check valves 68 and 69 into a pressure-balancing valve assembly 70. After pressure-balancing, the hot water and cold water are respectively introduced into hot-water side and cold-water side flow-rate adjusting valves 71 and 72 where, the mixing ratio of the hot water and the cold water is adjusted. FIG. 5 shows a detailed arrangement of each of the flow-rate adjusting valves 71 and 72. Each of the flow-rate adjusting valves 71, 72 comprises a valve seat member 73 and a valve member 74 connected through a rectangular hole thereof to a drive shaft 75 which is in turn coupled to a driving device 76 of FIG. 4. The valve seat member 73 and valve-member 74 respectively have holes 73' and 74' and are formed to be substantially equal in configuration to each other so that the flow-rate of the hot water or cold water is adjustable in accordance with the rotational position of the valve member 74 which depends upon the rotational movement of the drive shaft 75 due to the operation of the driving device 76.

Figure 6:
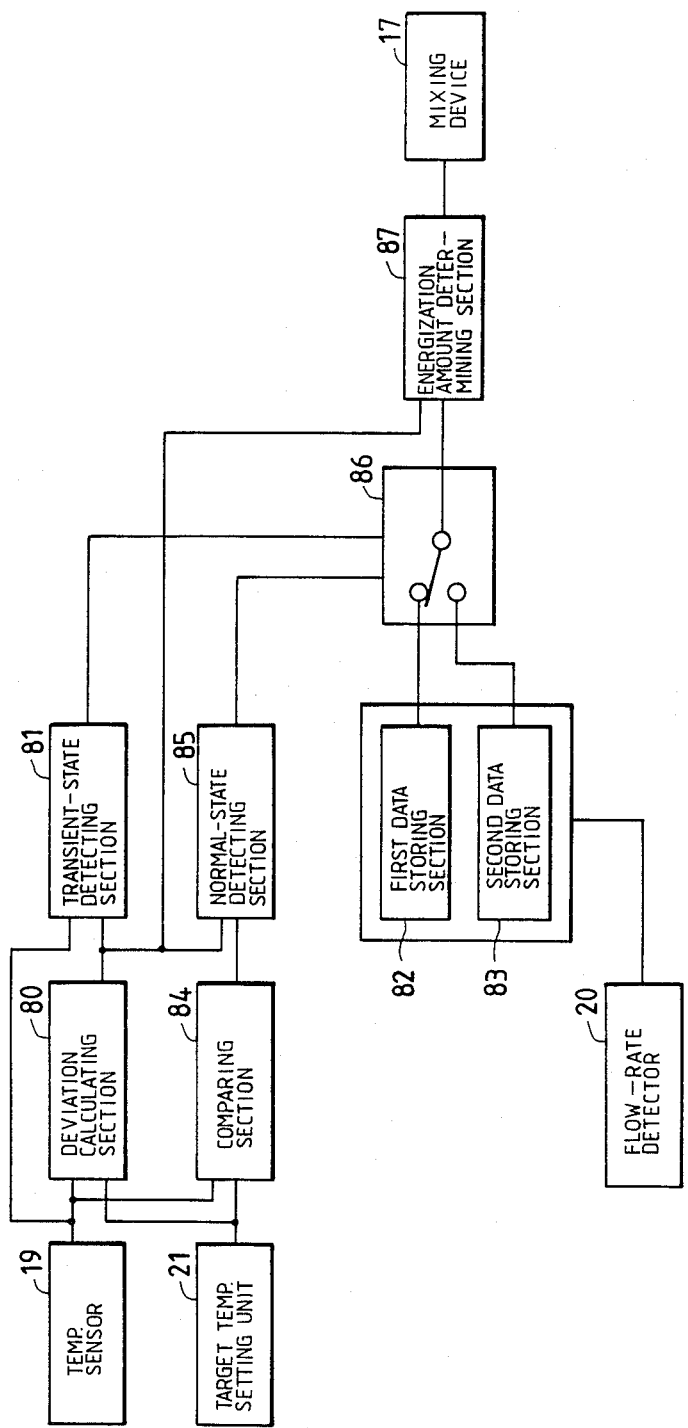
FIG. 6 is a block diagram for describing an arrangement and operation of a control unit of the FIG. 1 system.

A description in terms of an arrangement and operation of the control unit 22 will be described hereinbelow with reference to FIG. 6. The control unit 22 may be constructed of a well known microcomputer including a central processing unit CPU, memories and so on. In FIG. 6, the output signals from the temperature sensor 19 and target temperature setting unit 21 are supplied to a deviation calculating section 80 to calculate the temperature deviation, and the output signal of the temperature sensor 19 and the output signal of the deviation calculating section 80 are inputted into a transient-state detecting section 81 which in turn checks the completion of flow-out of temperature-lowered hot water in the water mixing device 17 through the water-mixture supply passage 18 on the basis of the magnitude of the temperature deviation and the variation of the temperature of the water mixture flowing through the water-mixture supply passage 18. Also included in the control unit 22 is a memory unit comprising a first control data storing section 82 and a second control data storing section 83, the first control data storing section 82 storing the relation between the temperature deviation at the time of the transient-state after the completion of flow-out of the temperature-lowered hot water (or the difference between the set temperature and the temperature of the water mixture thereat), or the temperature deviation and its gradient, and the control amount (for example, gain of drive motor) to mixing device 15 and the second control data storing section 83 storing the relation between the temperature deviation at the normal state (or the difference between the set temperature and the temperature of the water mixture thereat), or the temperature deviation and its gradient, and the control amount to the mixing device 17. The memory unit is coupled to the flow-rate detector 20 to receive the signal therefrom so as to control the gain of the mixing device 17 in accordance with the flow rate of the water mixture.

On the other hand, the output signals from the temperature sensor 19 and the temperature setting unit 21 are further coupled to a comparing section 84 for comparing the set temperature with the temperature of the water mixture. The comparing section 84 is coupled to a normal-state detecting section 85 which is in turn coupled to the deviation calculating section 80. The normal-state detecting section 85 determines whether the water mixture is independent of the temperature-lowered hot water and results in the normal state, on the basis of the result of the comparison of the comparing section 84 and the sign (positive or negative) of the temperature deviation from the deviation calculating section 80.

The transient-state detecting section 81 and the normal-state detecting section 85 are connected to a switching section 86 which performs switching operation between the first control data storing section 82 and the second control data storing section 83 in accordance with the output signals indicative of the transient-state and the normal state from the transient-state detecting section 81 and the normal-state detecting section 85 so that either of the abnormal-state detecting section 81 or the normal-state detecting section 85 becomes in connecting relation to an energization-amount determining section 87 which is responsive to the output signal indicative of the temperature deviation from he deviation calculating section 80 for determining the energization amounts such as rotational speed and rotational direction of the driving motor with respect to the mixing device 17, using the data from the first or second control data storing section 82 or 83. That is, in response to the output signal from the transient-state detecting section 81, the switching section 86 causes the first control data storing section 82 to be coupled to the energization-amount determining section 87, and on the other hand, in response to the output signal from the normal-state detecting section 85, it causes the second control data storing section 83 to be coupled to the energization-amount determining section 87. The determination of the energization, amounts of the mixing device 17 may be made in accordance with the fuzzy control and at this time the energization-amount determining section 87 inputs the energization amount to the mixing device 17 using the data (control rule) for the control stored in the first or second control data storing sections.

Figure 7:
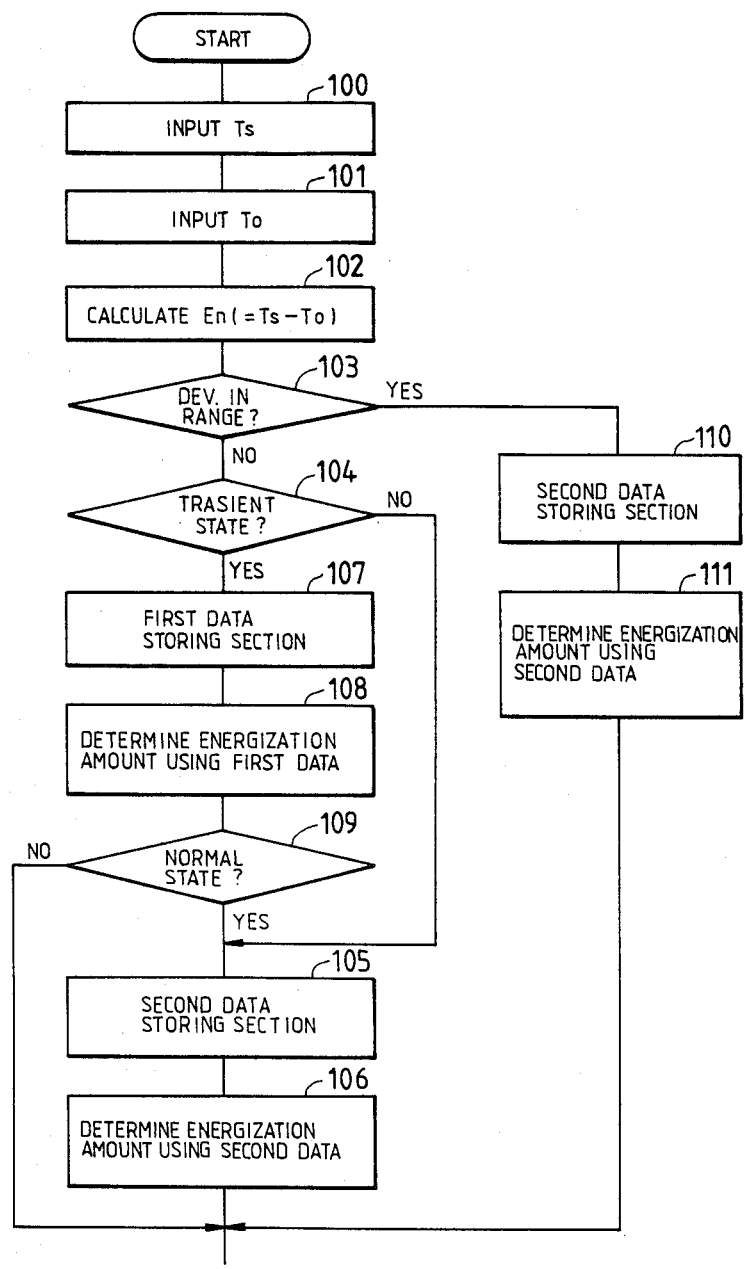
FIG. 7 is a flow chart for describing the operation of the FIG. 6 control unit arrangement.

A further detailed description in terms of the operation of the control unit 22 will be made hereinbelow with reference to FIG. 7. In use of the temperature-adjustable water supply system according to the embodiment of the present invention, the flow-rate adjusting valve assembly 54 is initially energized with a large gain so as to be opened quickly for starting supply of the water mixture through the water-mixture supply passage 18 to a water-using object. In response to the supply of the water-mixture, the temperature sensor 19 outputs a signal indicative of the temperature To of the water-mixture flowing through the water-mixture supply passage 18. The deviation calculating section 80 calculates a temperature deviation En on the basis of the temperature To of the mixture water and the temperature Ts manually set in the target temperature setting unit 21 (steps 100 to 102). Concurrently, the comparing section 84 operates to compare the set temperature with the temperature of the water mixture, and the result of the comparison is supplied to the normal-state detecting section 85. Subsequently, it is checked in the normal-state detecting section 85 whether the temperature deviation En is in a predetermined range (step 103). When the temperature deviation En is in the predetermined range, determination is made whether the temperature of the water mixture is in the normal state. If En is not in the predetermined range, made is the decision that the temperature of the water mixture is in the abnormal state, such as the transient state and the presenting state of the temperature-lowered hot water. Here, the transient state means a state of the water-mixture temperature before reaching the normal state after the completion of flow-out of the temperature-lowered hot water through the water-mixture supply passage 18. The transient-state detecting section 81 checks whether the water-mixture is in the transient state (step 104), i.e., in the state after completion of the temperature-lowered hot water, on the basis of the magnitude of the temperature deviation En, the gradient of the temperature deviation En, the sign of the temperature deviation En and so on. This is based upon the fact that the water-mixture temperature is increased after the completion of flow-out of the temperature-lowered hot water. The completion of flow-out of the temperature-lowered hot water can be basically detected on the basis of the temperature deviation, i.e., when the temperature of the water mixture reaches the set temperature. However, there is the possibility that the temperature of the water mixture does not reach the set temperature irrespective of the completion of the flow-out of the temperature-lowered hot water because of an excessive working of the cold-water side valve. In this case, the variation of the temperature becomes constant. Thus, the decision of the completion is made when either the temperature deviation or the gradient thereof satisfies the completion condition. If so, the switching section 86 causes the energization-amount determining section 87 to be coupled to the first control data storing section 82 (step 107). The energization-amount determining section 87 determines the energization amount (control amount) of the mixing device 17 using the data stored in the first control data storing section 82 and outputs a signal indicative of the energization amount to the mixture device 17 which is in turn controlled in accordance with the output signal therefrom (step 108). Otherwise, the switching section 86 causes the energization-amount determining section 87 to be coupled to the second control data storing section 83 (step 105). The energization-amount determining section 87 determines the energization amount (control amount) of the mixing device 17 using the data stored in the second control data storing section 83 and outputs a signal indicative of the energization amount to the mixture device, 17 (step 106). Here, the system is on supply of the temperature-lowered hot water through the water-mixture supply passage 18 to the water-using object. In response to the termination of the transient-state of the temperature of the water mixture during the execution of the step 108 (step 109), the switching section 86 performs the switching operation from the first control data storing section 82 to the second control data storing section 84, followed by the execution of the step 106.

On the other hand, if in the step 103 the temperature deviation En is in the predetermined range, the switching section 86 causes the energization-amount determining section 87 to be coupled to the second control data storing section 83 (step 110) so as to determine the energization amount of the mixing device 17 using the data of the second control data storing section 83. At this time, the water-mixture temperature is in the normal state.

Here, the control of the mixing device 17 is performed such that, when the energization-amount determining section 87 is coupled to the first control data storing section 82, the gap between the hot-water side flow-rate adjusting valve member 34 and the hot-water side valve seat 36 is adjusted to be greater than the gap between the cold-water side flow-rate adjusting valve member 35 and the cold-water side valve seat 37 so as to quickly make absent the temperature-lowered hot water. That is, the energization amount and direction (i.e., rotational speed and rotational direction of the motor 45) in the transient state is different from the same in the normal state. This results in the stable supply of appropriate-temperature hot water without overshooting and undershooting of the temperature of the water mixture with respect to the set temperature.

Figure 8:
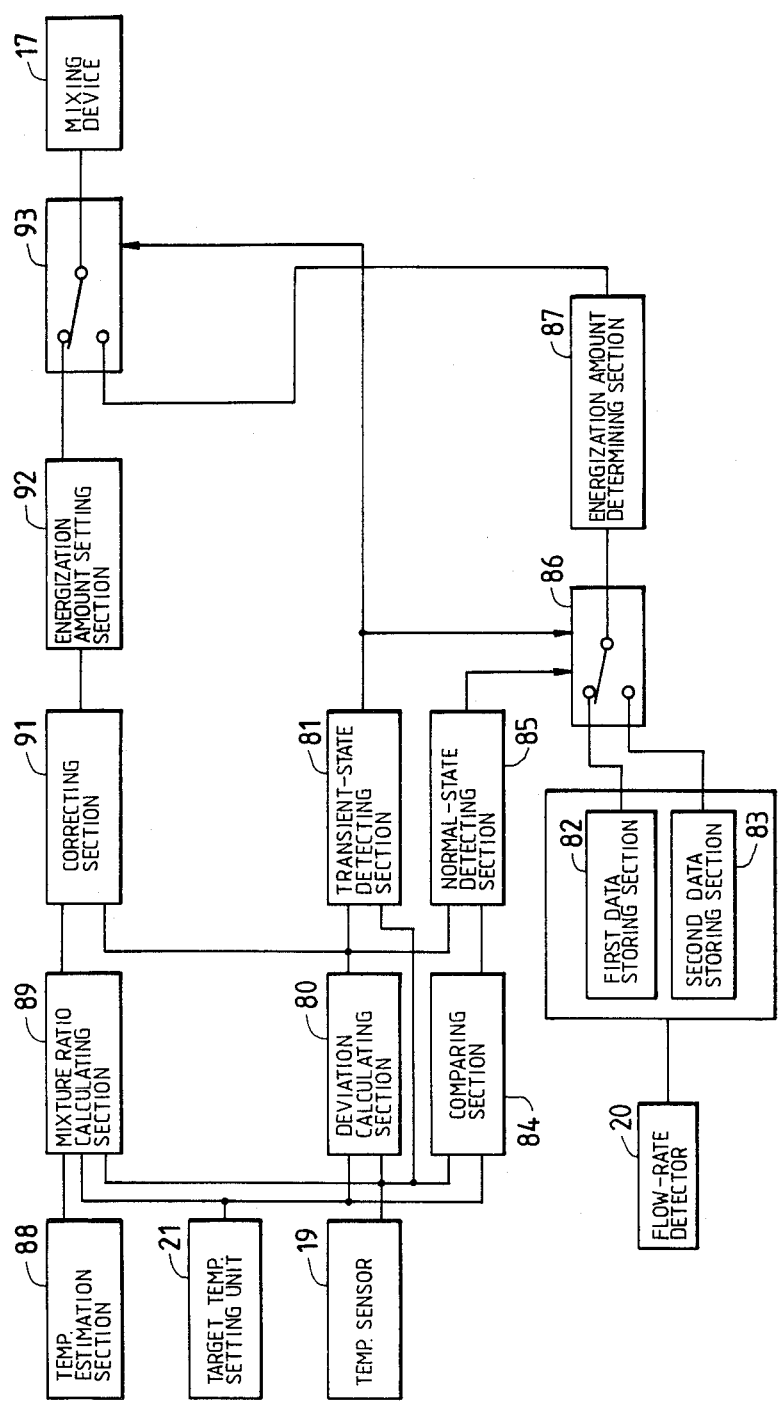
FIG. 8 is a block diagram showing another arrangement of the control unit of FIG. 1.

FIG. 8 is a block diagram showing an arrangement and operation of the control unit 22 according to a further embodiment of the present invention, where parts corresponding to those of the FIG. 6 arrangement of the first-mentioned embodiment of this invention are illustrated with the same numerals and the detailed description will be omitted for brevity. This arrangement and operation of the control unit 22 is applied to the temperature-adjustable water supply system with the FIG. 4 mixing device.

In FIG. 8, illustrated at numeral 88 is a supply-water temperature estimation section for estimating the temperature of hot water introduced into the hot-water side flow-rate adjusting valve 71 shown in FIG. 4, i.e., for initially determining the hot-water temperature in accordance with predetermined data. The initial temperature of the hot, water can also be detected by an appropriate means. Furthermore, the temperature sensor 19 measures the temperature of the water mixture to be supplied to the water-mixture supply passage 18, in response to turning-on of a power source, i.e., on starting of the supply of the water mixture. A signal indicative of the measured water mixture temperature from the temperature sensor 19 and a signal indicative of the estimated temperature from the supply-water temperature estimation section 88 are supplied to a mixture ratio calculating section 89 which in turn obtains a mixture ratio of the hot water and the cold water on the basis of the measured and estimated temperatures. The mixture ratio can be obtained in accordance with an equation: $Ts-Tw/Th-Ts=Qw/Qh$ where Ts represents a temperature set in the target temperature setting unit 21, Tw designates a temperature of the cold water which is detected in advance by means of an appropriate means (not shown), Th is a temperature of the hot water (the estimated temperature is here used therefor), Qw represents a flow rate of the cold water, and Qh depicts a flow rate of the hot water. The temperature sensor 19 and the target temperature setting unit 21 are coupled to a deviation calculating section 80 so as to calculate the temperature deviation. The output signal of the deviation calculating section 80 representing the calculated temperature deviation and the output signal of the mixture ratio calculating section 89 representing the calculated mixture ratio are supplied to a mixture-ratio correcting section 91 so as to correct the calculated mixture ratio therein on the basis of the temperature deviation. The energization-amount setting section 92 is responsive to the output signal of the mixture-ratio correcting section 91 for obtaining the control amount, i.e., energization amount and energization direction of the mixing device 17 (in this case, the driving speeds and driving directions of the driving devices 76 for the hot-water side and cold-water side flow-rate adjusting valves 71, 72). The obtained control amount is supplied through a first switching section 93 to the mixing device 17.

Furthermore, the output signals from the temperature setting unit 21 and the temperature sensor 19 are inputted into a comparing section 84 which is in turn coupled to a normal-state detecting section 85 in which it is checked whether the temperature (deviation) enters in a predetermined range based upon the set temperature of the target temperature setting unit 21. When it is in the predetermined range, the normal-state detecting section 85 outputs a switching signal to a second switching section 86 which in turn causes a second control data storing section 83 to be coupled to an energization-amount determining section 87. On the other hand, a transient-state detecting section 81 is responsive to the output signal of the deviation calculating section 80 and the output signal of the temperature sensor 19 for checking, on, the basis of the calculated temperature deviation (the difference between the set temperature and the water-mixture temperature) and the gradient of variation of the water mixture temperature, whether the supply of the temperature-lowered hot water is ended, that is, the temperature-lowered hot water has flowed out from the system. Here, when the water-mixture temperature enters into the predetermined temperature range based on the set temperature and the gradient of the variation of the water mixture temperature becomes greater than a predetermined value, the transient-state detecting section 81 determines that the water-mixture temperature is in the transient state after the flow-out of the temperature-lowered hot water is ended and outputs a switching signal to the second switching section 86. The second switching section 86 performs the switching operation between the first and second control data storing sections 82 and 83 in response to the output signals of the normal-state detecting section 85 and the transient-state detecting section 81, so that either the first or second control data storing sections 82 and 83 is coupled to the energization-amount determining section 87. The output signal indicative of the control amounts from the energization-amount determining section 87 is supplied through the first switching section 93 to the mixing device 17. The first switching section 93 is operated on starting of the supply of the water mixture, stopping of the supply of the water mixture and adjusting of the flow rate of the water mixture such that the energization-amount setting section 92 is coupled to the mixing device 17 and otherwise operated on normal state and transient state such that the energization-amount determining section 87 is coupled thereto. The flow-rate detector 20 is also coupled to the control unit 22 so as to, if required, change the energization gain of the mixing device 17 on the basis of the flow rate of the water mixture.

Figure 9:
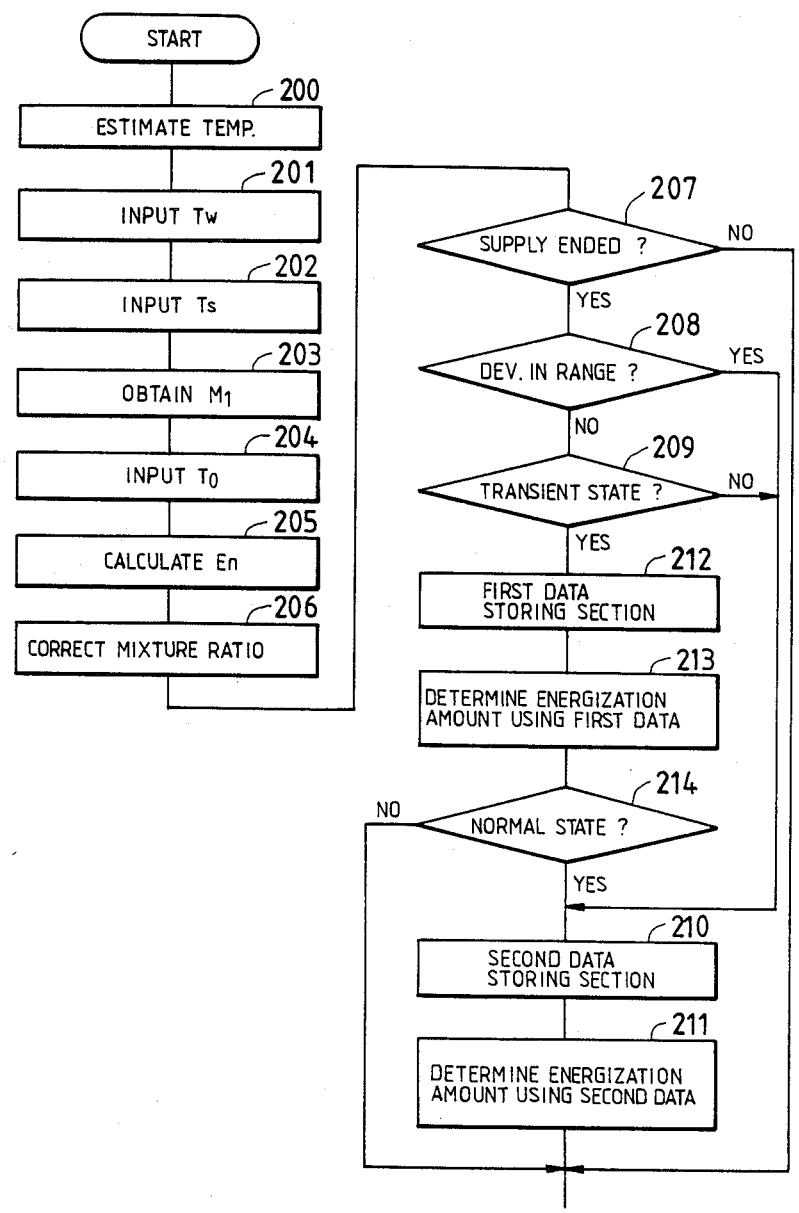
FIG. 9 is a flow chart for describing the operation of the FIG. 8 control unit arrangement.

The above-mentioned second embodiment in terms of operation of the temperature-adjustable water supply system of this invention will be further described with reference to a flow chart of FIG. 9. In FIG. 9, in response to starting of the supply of the water mixture, the supply-water estimation section 88 estimates the temperature of hot water to be supplied to the hot water side flow-rate adjusting valve 71 (step 200). Concurrently with the estimation, only the cold-water side flow-rate adjusting valve 72 is opened in order to measure the temperature Tw of cold water by means of the temperature sensor 19 and then closed after the completion of the measurement of the cold water temperature Tw (step 201). Furthermore, the set temperature Ts is inputted from the target temperature setting unit 21 (step 202). The mixture ratio calculating section 89 calculates the mixture ratio Ml on the basis of the estimated temperature Th, the set temperature Ts and the measured cold-water temperature Tw (step 203). Here, at the initial stage, the energization-amount setting section 92 directly obtains the energization amounts (for example, rotational speeds and directions of the motors of the driving devices 76) on the basis of the calculated mixture ratio Ml without using the mixture-ratio correcting section 91. At this time, the first switching section 93 is operated so that the energization-amount setting section 92 is coupled to the mixing device 17.

After supply of hot-water together with the cold water, the temperature To of the water mixture is sensed by the temperature sensor 19 (step 204), and the temperature deviation En is calculated on the basis of the sensed temperature To and the set temperature Ts in the deviation calculating section 80 (step 205). At this stage, the mixture-ratio correcting section 91 corrects the calculated mixture ratio on the basis of the temperature deviation En in order to control the mixing device 17 (obtain a suitable control amount) so that the temperature To of the water mixture becomes equal to the set temperature Ts (step 206). The mixture-ratio correction is made by adding thereto a value proportional to the temperature deviation, a value obtained by differential operation of the temperature deviation or the like or in accordance with a known technique.

Thereafter, when the flow rate measured by the flow-rate detector 20 reaches a predetermined value or when either the hot-water side or cold-water side flow-rate adjusting valves 71 or 72 is in the full-opened state, the decision is made where the supply of the first stage water mixture is completed (step 207). In response to this decision of the step 207, the first switching section 93 is actuated so that the mixing device 17 is coupled to the energization-amount determining section 87. Furthermore, the temperature To of the water mixture and the set temperature Ts are compared with each other so as to check whether the temperature deviation En is in a predetermined range (step 208). The case that it is not in the predetermined range means the state that the temperature-lowered hot water is present in the hot-water supply passage 16. The transient-state detecting section 81 successively checks the completion of flow-out of the temperature-lowered hot water, which is determined when the temperature To of the water mixture is out of the predetermined range and the gradient of variation of the water mixture temperature To is above a predetermined value (step 209). With the temperature To of the water mixture becoming in the predetermined range and the gradient of variation of the water mixture temperature To becoming above a predetermined value, the second switching section 86 performs the switching operation so that the energization-amount determining section 87 is coupled to the first control data storing section 82 (step 212). On the presence of the temperature-lowered hot water, as well as in the first embodiment, the hot-water side flow-rate adjusting valve 71 is in the greatly opened condition. Thus, contrary to the case of the normal-state, the opening degree of the hot-water side flow-rate adjusting valve 71 is decreased and the opening degree of the cold-water side flow-rate adjusting valve 72 is increased (step 213). When the temperature To of the water mixture reaches the set temperature Ts or when the gradient of variation of the water mixture temperature To becomes negative before reaching, the normal-state detecting section 85 determines that the state becomes normal (step 214). As a result, the second switching section 86 causes the second control data storing section 83 to be coupled to the energization-amount determining section 87 (step 210) and the energization amounts are determined on the basis of the temperature deviation and/or its variation gradient using the data of the second control data storing section 83 (step 211).

With the above-mentioned control, the temperature-lowered hot water is quickly discharged and thereafter the mixing device 17 is appropriately adjusted, resulting in prevention of the overshooting of the temperature of the water mixture.

Figure 10:
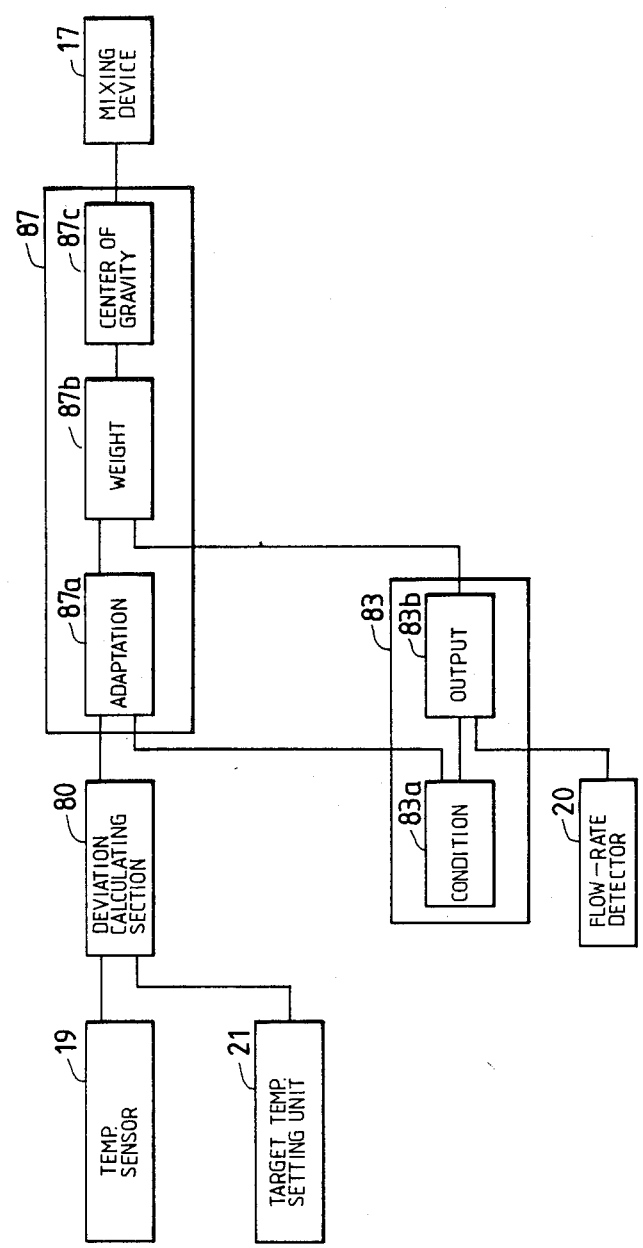
FIG. 10 is a block diagram illustrating one example of the temperature control.
Figure 11:
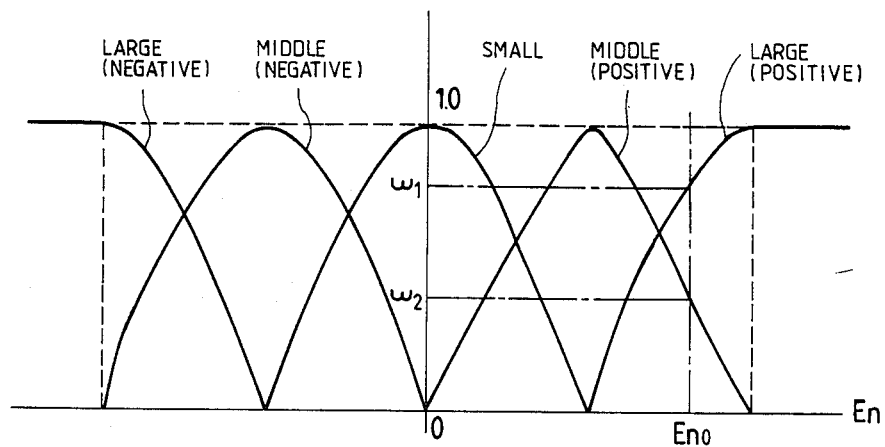
FIG. 11 is an illustration of membership functions.

FIG. 10 is a block diagram illustrating one example of the temperature control of the supply water in the normal state In FIG. 10, the second control data storing section 83, as well as the first control data storing section 82, includes a condition storing portion 83a and an output storing portion 83b. The condition storing portion 83a stores conditions (control variables) for the control of the energization amounts of the mixing device 17 such as temperature deviations and gradient of the temperature deviations, which are graded in magnitude and sign (positive or negative) with membership characteristic functions such as exponential functions as shown in FIG. 11. The output storing portion 83b stores outputs corresponding to the conditions of the condition storing portion 83a. In the functional relation to the condition storing portion 83a, for example, if the temperature En is large in the positive direction, the output storing portion 83b outputs a signal indicating that the energization amount of the mixing device 17 is made large in the negative direction. The energization-amount determining section 87 includes an adaptation calculating portion 87a which is coupled to the condition storing portion 83a thereof to obtain the adaptation between the obtained temperature deviation and the condition of the condition storing portion 83a. The energization-amount determining section 87 further includes a weight calculating portion 87b for performing weighting on the basis of the obtained adaptation and the output of the output storing portion 83b and a center-of-gravity calculating portion 97c for obtaining the energization amounts to the mixing device 17 in accordance with the center-of-gravity calculation.

Figure 12:
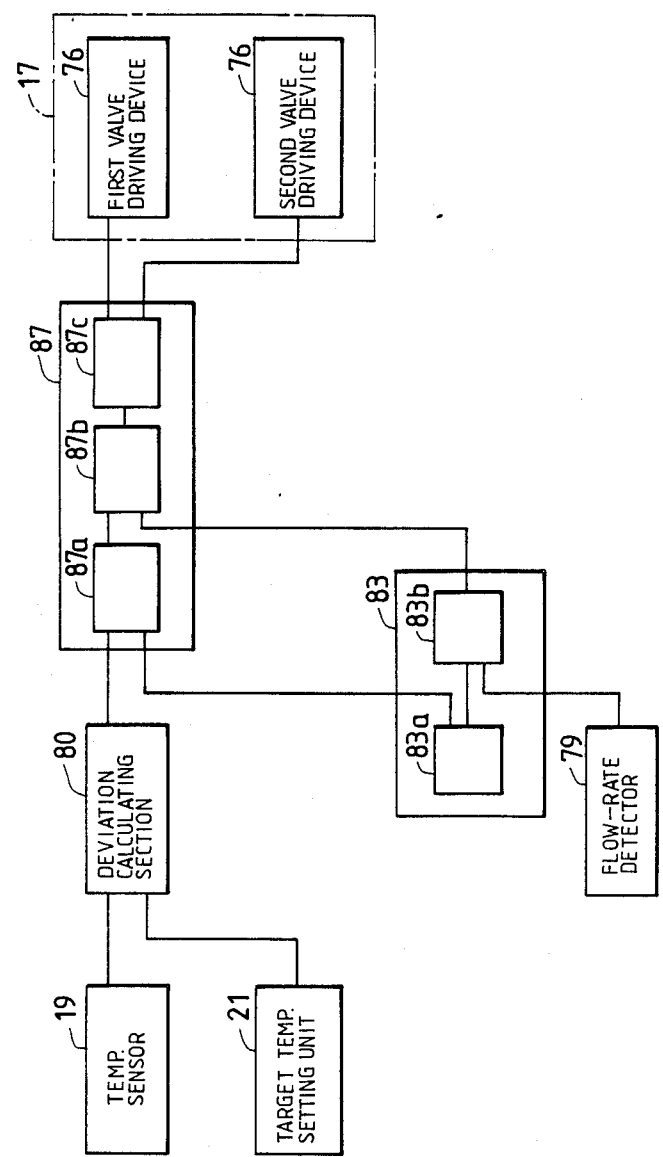
FIG. 12 is a block diagram showing another example of the temperature control.

FIG. 12 is a block diagram illustrating another example of the temperature control of the supply water in the normal state. In this case, the output of the energization-amount determining section 87 is supplied to the two driving devices 76 for driving the hot-water side flow-rate adjusting valve 71 and the cold-water side flow-rate adjusting valve 72. The other portions corresponds to the first-mentioned example and the description will be omitted.

Figure 13:
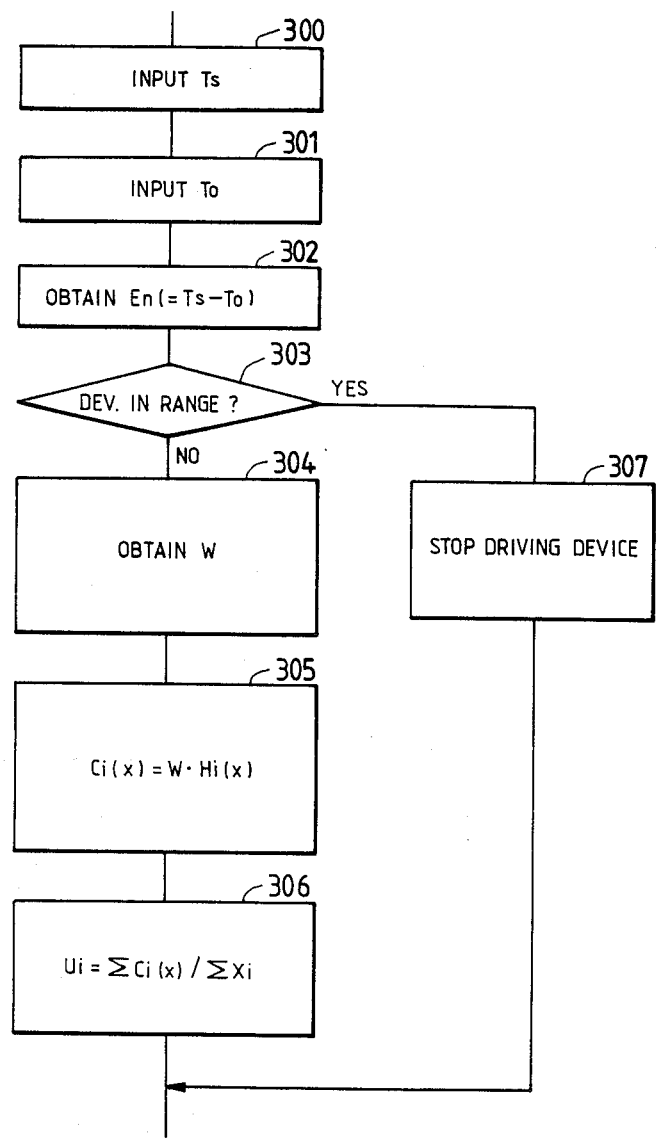
FIG. 13 is a flow chart for describing the operation of the FIG. 12 control.

Operation will be described hereinbelow with reference to a flow chart of FIG. 13. When, during supply of water mixture with a set temperature, the user operates the target temperature setting unit 21 in order to change the set temperature or when the temperature of the water mixture is changed due to a cause, the deviation calculating section 80 calculates a temperature deviation En (step 302) on the basis of the temperature Ts set in the target temperature setting unit (step 300) and the temperature To of the water mixture measured by the temperature sensor 19 (step 301). Here, it is assumed that the obtained temperature deviation En is Eno. In response to the calculation of the temperature deviation Eno, if the temperature deviation is in a predetermined allowable range, the mixing device 17 is stopped in the present state (step 307). On the other hand, if the temperature deviation is not in the predetermined allowable range (step 303), the adaptation calculating portion 87a of the energization-amount determining section 87 obtains an adaptation w on the basis of the temperature deviation Eno using the conditions stored in the condition storing portion 83a of the second control data storing section 83 (step 304). For example, as shown in FIG. 11, the adaptations are obtained by taking the junction points between the temperature deviation Eno and the membership functions as illustrated in the following table 1.

TABLE 1

| Condition | Adaptation |
| --- | --- |
| Large in positive direction | w1 |
| middle in positive direction | w2 |
| small | 0 |
| middle in negative direction | 0 |
| large in negative direction | 0 |

The obtained adaptation w is supplied to the weight calculating portion 87b to perform the weighting with respect to the output portion 83b of the second control data storing section 83, i.e., $Ci(x) = w \times Hi(x)$ where $Hi(x)$ represents the output and $Ci(x)$ designates the result of the weighting, (step 305). The results of the weighting are shown in the following tables 2 and 3. The table 2 shows the results in the FIG. 10 example and the table 3 shows the results in the FIG. 12 example.

In the table 3, character P represents positive and character N represents negative.

TABLE 2

| Condition | Output | Weighted |
| --- | --- | --- |
| Large (positive) | Large (negative) | w1 × Output |
| Middle (positive) | Middle (negative) | w2 × Output |
| Small | Small | 0 |
| Middle (negative) | Middle (positive) | 0 |
| Large (negative) | Large (positive) | 0 |

TABLE 3

| | First Driver (76) | | Second Driver (76) | |
| --- | --- | --- | --- | --- |
| Condition | Output | Weighted | Output | Weighted |
| Large (P) | Large (N) | w1 × Output | Large (P) | w1 × Output |
| Middle (P) | Middle (N) | w2 × Output | Middle (P) | w2 × Output |
| Small | Small | 0 | Small | 0 |
| Middle (N) | Middle (P) | 0 | Middle (N) | 0 |
| Large (N) | Large (P) | 0 | Large (N) | 0 |

Thereafter, the center-of-gravity calculating portion 97c composites the functions of the output portion 83b (see FIGS. 14A, 14B) so as to obtain the center of gravity thereof, i.e., $ui = \Sigma Ci(x)/\Sigma xi$ where ui represents the center of gravity and xi designates the energization amount, (step 306). The obtained center of gravity is supplied as the energization amount to the mixing device 17.

Figure 14A:
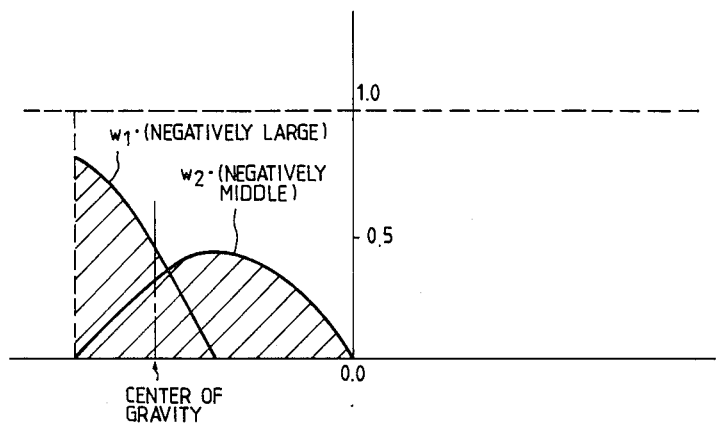
FIGS. 14A and 14B are illustrations for obtaining the center of gravity.
Figure 14B:
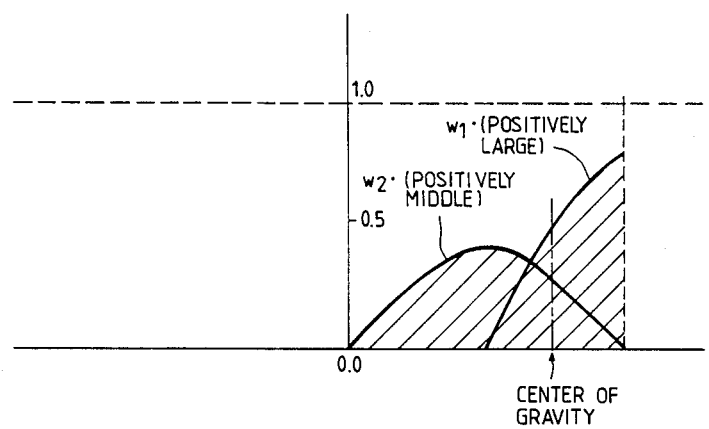

FIGS. 14A and 14B are illustrations of obtaining the center of gravity in the step 306. Here, in the case of the FIG. 10 example, only the calculation shown in FIG. 14A is performed. In the case of the FIG. 12 example, both the calculations shown in FIGS. 14A and 14B are performed.

With the above-mentioned control, it is possible to quickly and stably supply water with an appropriate (set) temperature.

Furthermore, the obtained energization amount is corrected in accordance with the flow rate measured by means of the flow-rate detector 20. That is, when th flow rate is large, the energization gain of the mixing device 17 is increased, when the flow rate is small, it is decreased. The range of the membership function (energization gain controlling range) of each of the first and second control data storing sections 82 and 83 (FIG. 11) is changeable in accordance with the magnitude of the flow rate. Thus, the magnitudes of the outputs (energization amounts to the mixing device 17) in the normal state and in the temperature-lowered hot water presenting state are different from each other and each of the magnitudes of the outputs depends upon the magnitude of the flow rate. Particularly, on the presence of the temperature-lowered hot water, the opening degree of the hot-water side valve and therefore the energization gain becomes greater.

Figure 15:
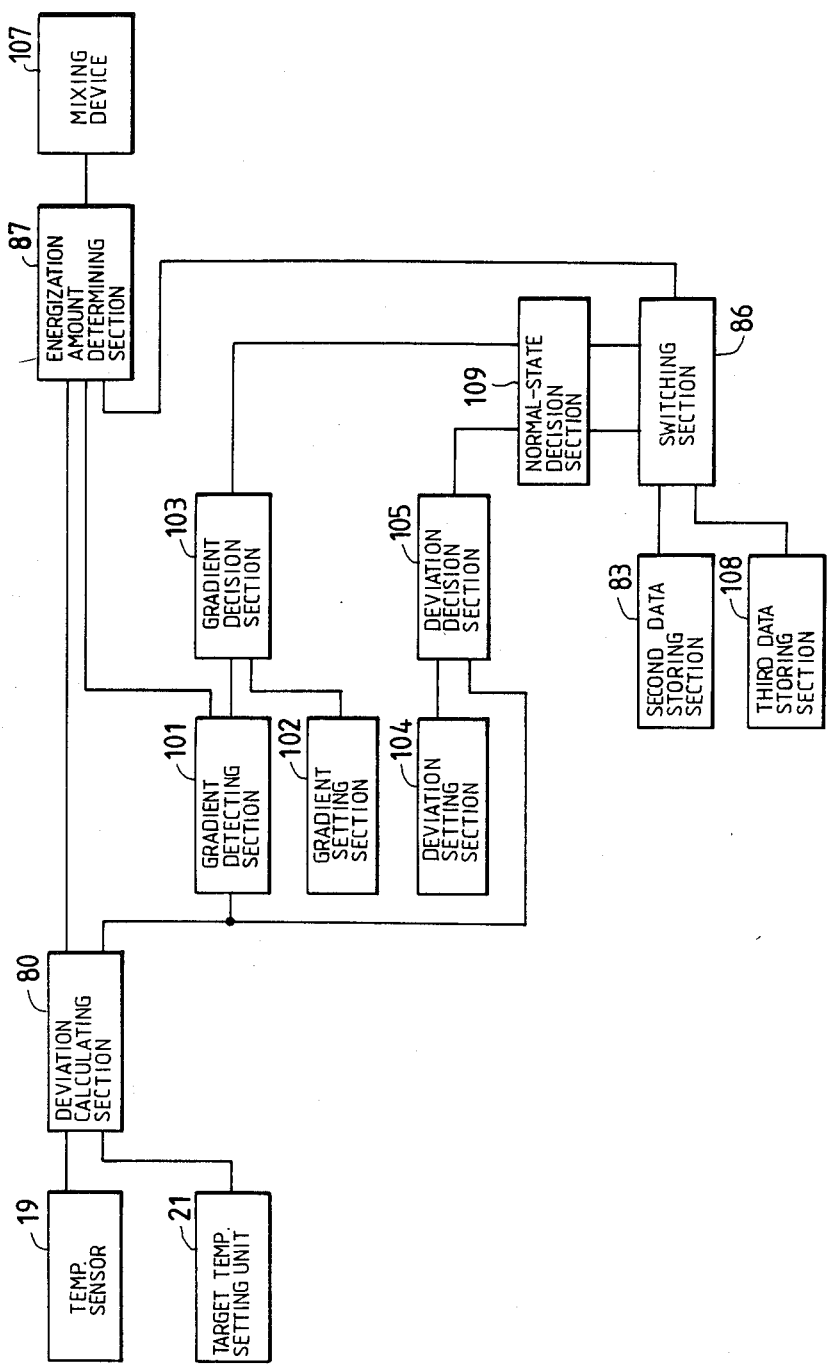
FIG. 15 is a block diagram showing a further arrangement of the control unit of FIG. 1.

A further embodiment of this invention will be described with reference to FIGS. 15 through 17. FIG. 15 is a block diagram for describing an arrangement and operation of the control unit 22 according to a third embodiment of this invention. Parts corresponding to those of the above-described embodiments are substantially marked with the same numerals and the detailed description will be omitted for brevity. In FIG. 15, the output signals of the temperature sensor 19 and the target temperature setting unit 21 are supplied to a deviation calculating section 80 to calculate the temperature deviation on the basis of the temperature of the water mixture flowing through the water-mixture supply passage 18 and the target temperature set in the target temperature setting unit 21. The output signal of the deviation calculating section 80 indicative of the temperature deviation is inputted into a gradient detecting section 101 for obtaining the gradient of variation of the temperature deviation. The obtained gradient of variation of the temperature deviation is compared in a gradient decision section 103 with a temperature preset in a gradient setting section 102 so as to check the state of the variation of the temperature deviation. Also included in the control unit 22 is a deviation setting section 104 the output of which is inputted into a deviation value decision section 105 where it is checked whether the temperature deviation calculated in the deviation calculating section 80 becomes below a predetermined value. That is, it is checked whether the temperature of the water mixture becomes higher than the set temperature and exceeds a predetermined temperature which is a temperature value obtained by adding to the set temperature a value corresponding to the temperature deviation. This prevents the error-operation due to the temperature irregularity of the water mixture. The control unit 22 further includes a second control data storing section 83 which stores the relation between the water-mixture temperature in the normal state and the energization amount of the mixing device 17 and a third control data storing section 108 which stores the water-mixture temperature, i.e., the magnitude of the temperature deviation and the gradient of the temperature deviation, on rapid variation of the temperature of the water mixture and the energization amount of the mixing device 17. The third control data storing section 108 can be arranged similarly to the arrangement of the above-mentioned first control data storing section 82. A switching section 86 is coupled to the gradient decision section 103 and the deviation value decision section 105 to perform the switching operation from the second control data storing section 82 to the third control data storing section 108 when the temperature deviation becomes greater than the predetermined value and the variation gradient thereof becomes greater than the predetermined gradient value so that the third control data storing section 108 is coupled to an energization-amount determining section 87 which is further coupled to the deviation calculating section 80 and the deviation gradient detecting section 101. The energization-amount determining section 87 determines the energization amounts to the mixing device 17 on the basis of the magnitude of the temperature deviation and/or the variation gradient.

FIG. 16 is a flow chart for describing the operation of the control unit 22. In FIG. 16, a temperature deviation En is obtained in the deviation calculating section 80 using the temperature To of the water mixture measured by the temperature sensor 19 and the temperature Ts set in the target temperature setting unit 21 (steps 400 to 402). The obtained temperature deviation En is checked whether it is smaller than the predetermined value set in the deviation setting section 104 (step 403) and the gradient of the temperature deviation is greater than a predetermined value set in the gradient setting section 102 (step 404). If the temperature deviation En is greater than the predetermined value and the gradient of the temperature deviation is smaller than the predetermined value (except for the case of change of the target temperature), in a normal-state deviation section 109, the decision is made in terms of the water mixture being in the normal state (step 405) and the switching section 86 performs the switching operation so that the second control data storing section 83 is coupled to the energization-amount determining section 87 (step 406). The energization-amount determining section 87 determines (infers) the control amount of the mixing device 17 using the control data of the second control data storing section 83 (step 407).

On the other hand, if the temperature deviation En is smaller than the predetermined value and the gradient thereof is greater than the predetermined value, the switching section 86 causes the third control data storing section 108 to be coupled to the energization-amount determining section 87.

Figure 17:
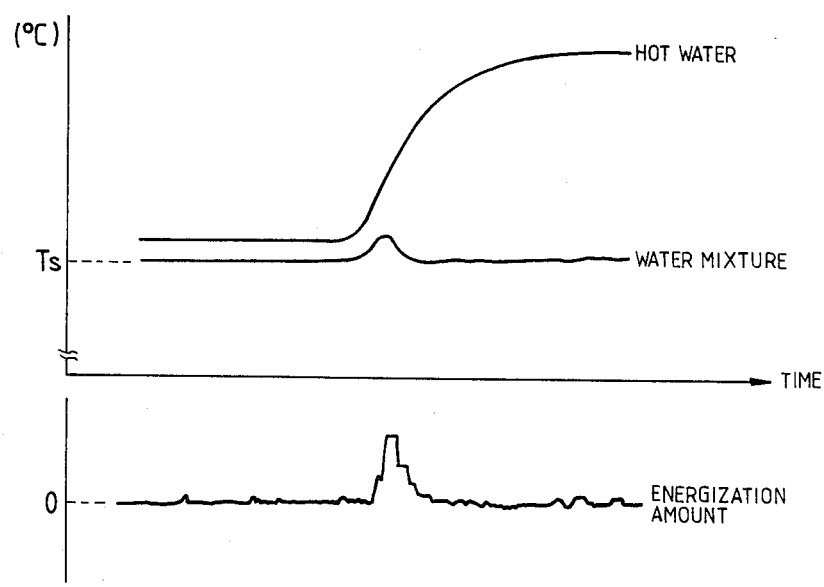
FIG. 17 is an illustration for describing the relation between the temperature of hot water and energization amount of the mixing device.

In the case that, as shown in FIG. 17, the temperature of the hot water supplied through the hot-water supply passage 16 is lowered to the vicinity of the set temperature Ts, that is, when the break between the previous use and the present use is relatively long, the temperature of the hot water is increased up to the normal temperature after completion of flow-out of the temperature-lowered hot water through the water mixture supply passage 18. For example, assuming that the initial temperature of the hot water is 50° and the set temperature is 40°, the temperature of the hot water becomes 80° thereafter. Here, the variation rate of the temperature increasing from 50° to 80° become greater as the length of the hot-water supply passage 16 is shorter. Therefore, it is required that the adjusting valve is quickly moved from the position at which the temperature of the hot water is 50° under the condition of the set temperature of 40° to the position at which the temperature of the hot water is 80° under the condition of the set temperature of 40°.

Figure 18:
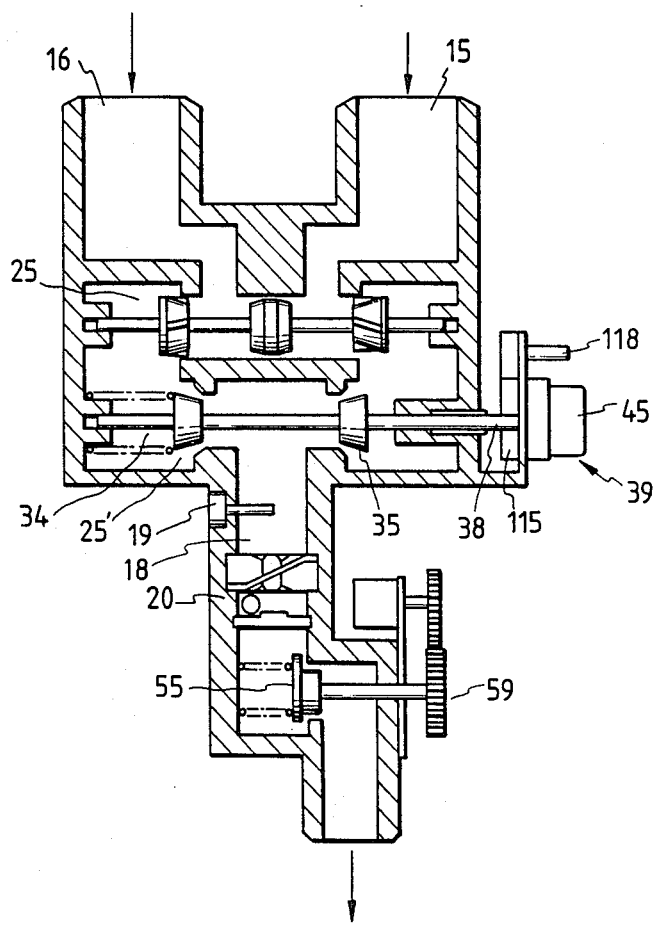
FIG. 18 shows further arrangement of the mixing device.
Figure 19A:
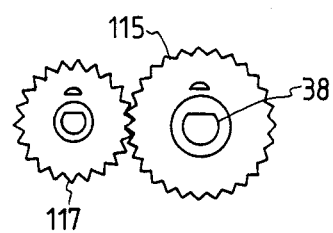
FIGS. 19A and 19B are illustrations for describing an opening degree detecting arrangement.
Figure 19B:
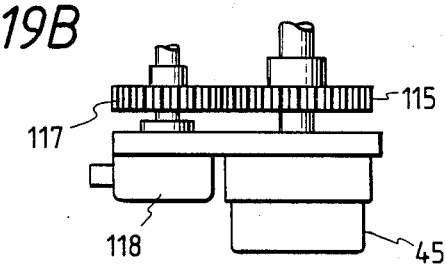

Further embodiments of the present invention will be described hereinbelow with reference to FIGS. 18 through 25. FIG. 18 shows an arrangement of the mixing device 17. The description of parts corresponding to those in FIG. 2 will be omitted for simplicity. Cold water and hot water are respectively supplied through a cold-water supply passage 15 and a hot-water supply passage 16 and introduced through a pressure balancing valve assembly 25 into a water mixing valve assembly 25' where the cold water and hot water are mixed at an appropriate mixture ratio which is controlled in accordance with the movement of a shaft 38 (opening degrees of hot-water side flow-rate adjusting valve 34 and cold-water side flow-rate adjusting valve 35) which is driven by a driving device 39. The opening degrees (operation amount) of the adjusting valves 34 and 35 can be detected by means of an opening-degree detector 118 composed of a variable resistor, an encoder or the like. FIGS. 19A and 19B show a detailed arrangement for detecting the opening degrees by the opening-degree detector 118. In FIGS. 19A and 19B, a toothed wheel 115 is mounted on the shaft 38 so as to be rotated with the rotation of the shaft 38. The rotation of the toothed wheel 115 is transferred to another toothed wheel 117 the rotation of which is transferred to the opening degree detector 118. The mixture of the cold water and hot water is discharged into a water-mixture supply passage 18 so as to flow therethrough to a water-using object. The temperature of the water mixture is sensed by means of a temperature sensor 19 and the flow rate thereof is detected by the aid of a flow-rate detector 20. The flow rate of the water mixture is adjustable by a flow-rate adjusting valve assembly 55.

Figure 20:
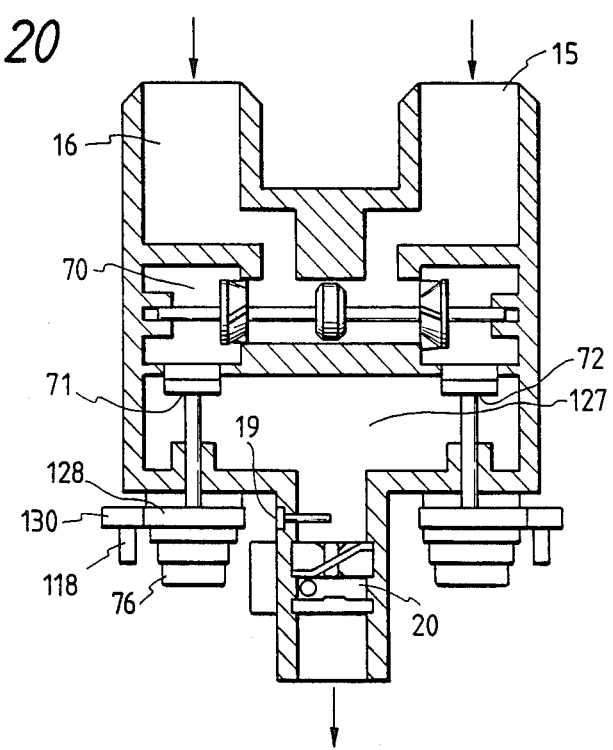
FIG. 20 shows a still further arrangement of the mixing device.

FIG. 20 shows a further arrangement of the mixing device 17. The description of parts corresponding to those in FIG. 4 will be omitted for brevity. In FIG. 20, cold water and hot water are respectively supplied through a cold-water supply passage 15 and a hot-water supply passage 16 and respectively enter into a pressure balancing valve assembly 70. The hot water and cold water are respectively introduced through a hot-water side flow-rate adjusting valve 71 and a cold-water side flow-rate adjusting valve 72 into a mixing chamber 127 where the hot water and cold water are mixed at an appropriate ratio which is determined by means of the hot-water side and cold-water side flow-rate adjusting valves 71 and 72. One end of each of drive shafts of the hot-water side and cold-water side flow-rate adjusting valves 71 and 72 is coupled to a driving device 76. On each of the drive shafts is mounted a toothed wheel 128 which in turn engaged with another toothed wheel 130. The toothed wheel 130 is connected to an opening-degree detector 103 to detect the opening degree of each of the hot-water side and cold-water side flow-rate adjusting valves 71 and 72.

Figure 21:
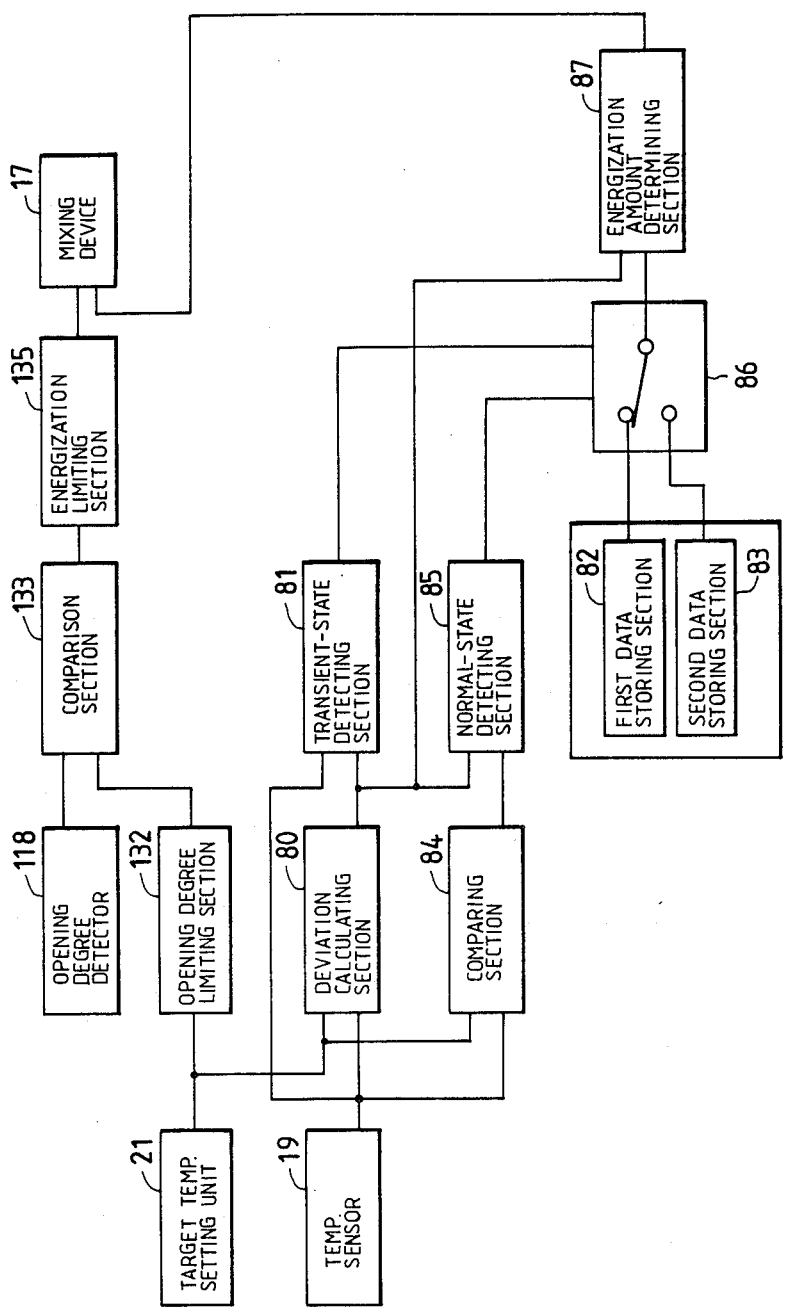
FIG. 21 is a block diagram showing an arrangement of the control unit of FIG. 1.

FIG. 21 is a block diagram showing one example of the arrangement of the control unit 22 which can be applied to a temperature-adjustable water supply system with the FIG. 18 mixing device. In FIG. 21, the control unit 22 similarly includes a deviation calculating section 80 responsive to the output signals of the target temperature setting unit 21 and temperature sensor 19 to calculate the temperature deviation and a comparing section 84 for comparing the temperature of the water mixture sensed by the temperature sensor 19 with the temperature set in the target temperature setting section 21. The output signal of the deviation calculating section 80 is inputted into a transient-state detecting section 81 to detect the completion of flow-out of the temperature-lowered hot water and the output signal of the comparing section 84 is supplied to a normal-state detecting section 85 so as to check whether the temperature of the water mixture is in the normal state.

Also included in the control unit 22 is an opening-degree limiting section 132 for setting a limit, or restriction, value of the operation (opening degree) of the mixing valve assembly 25' The opening-degree limiting section 132 is responsive to the output signal of the target temperature setting unit 21 so as to change the limit value to be set in accordance with the temperature set in the target temperature setting unit 21. The output signal of the opening-degree limiting section 132, indicative of the limit value, is supplied to an opening-degree comparison section 133 which compares the limit value of the opening-degree limiting section 132 with the opening degree (operating amount) of the mixing valve assembly 25' detected by the opening-degree detctor 118 so as to check whether the opening degree of the mixing valve assembly 25' reaches the set limit value. The output signal of the opening-degree comparison section 133 indicative of the fact that the opening degree of the mixing valve assembly 25' has reached thereto is inputted into an energization-amount limiting section 135. In response to the output signal of the opening-degree comparison section 133, the energization-amount limiting section 135 deenergizes the mixing valve assembly 25' so that the opening-degree of the mixing valve assembly 25' does not exceed the set limit value. For example, let it be assumed that the set temperature is 4020 and the temperature of the hot water (80° in the normal state) is lowered to 20° which is equal substantially to the temperature of the cold water. In this case, the normal-state detecting section 85 determines that the temperature-lowered hot water is present in the hot-water supply passage 16, that is, that the temperature-lowered hot water is on supply to the water-mixture supply passage 18, on the basis of the output signal of the comparing section 84. On the other hand, the transient-state detecting section 81 determines that the temperature-lowered hot water is on supply if the variation gradient of the temperature deviation obtained by the deviation calculating section 80 is below a predetermined value. In response to these states, a switching section 86 performs the switching operation so that an energization-amount determining section 87 is coupled to a second control data storing section 83 so as to determine the energization amounts to the mixing device 17 using the data stored in the second control data storing section 83. Meanwhile, if the opening-degree comparison section 133 decides that the opening degree of the mixing valve assembly 5' becomes coincident with the limit value set in the opening-degree limiting section 132, the energization-amount limiting section 135 stops the mixing valve assembly 25' as it is. Therefore, the temperature-lowered hot water is supplied to the water-mixture supply passage 18 with the operation of the mixing valve assembly 25' being stopped.

After completion of flow-out of the temperature-lowered hot water, when the gradient of variation of the temperature of the water mixture becomes greater than a predetermined value and the temperature of the water mixture becomes in a predetermined range based on the set temperature, in response to the output signals of the transient-state detecting section 81 and normal-state detecting section 85, the switching section 86 is operated to cause the first control data storing section 82 to be coupled to the energization-amount determining section 87.

Figure 22:
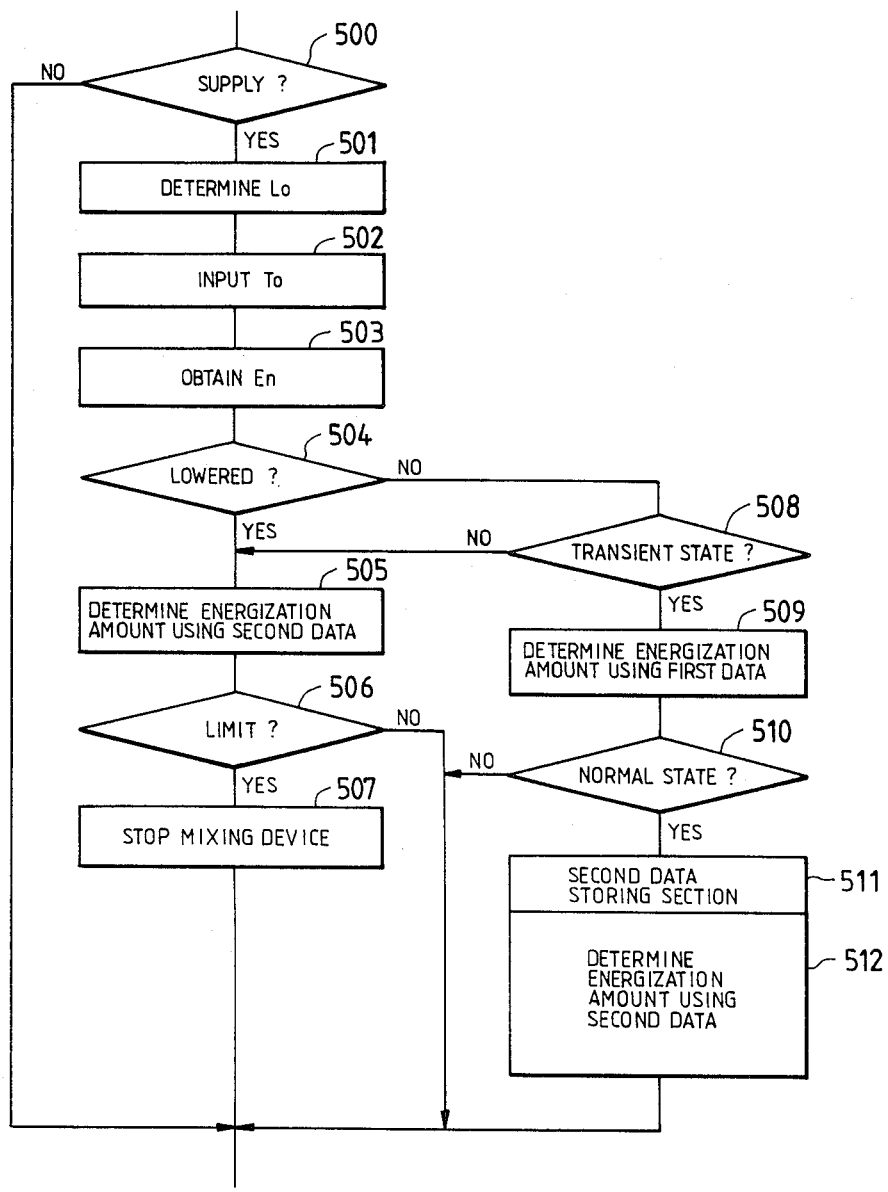
FIG. 22 is a flow chart for describing the operation of the FIG. 21 control unit.

FIG. 22 is a flow chart for a better understanding of the FIG. 21 control arrangement. In FIG. 22, in response to starting of water mixture supply (step 500), the opening-degree limiting section 132 sets an opening-degree limit value Lo on the basis of the set temperature Ts from the target temperature setting unit 21 (step 501) and the temperature To of the water mixture is inputted from the temperature sensor 19 (step 502). The deviation calculating section 80 calculates the temperature deviation En on the basis of the temperature To of the water mixture and the set temperature Ts (step 503). The normal-state detecting section 83 checks whether the temperature-lowered hot water is present in the hot-water supply passage 16 (step 504). Id so, the energization-amount determining section 87 determines the energization amounts to the mixing device 17 using the data of the second control data storing section 83 (step 505). In this case, the mixing device 17 is driven in the direction that the hot-water side valve is opened. When the opening-degree thereof reaches the opening-degree limit value which may be before reaching the full-opening state (ste 506), the mixing device 17 is stopped as it is (step 507).

Thereafter, in response to the temperature-lowered hot water being absent in the hot-water supply passage 16 (step 504) and the flow-out thereof being completed (Step 508), the energization-amount determining section 87 is switched to the first control data storing section 82 (step 509). When the normal-state detecting section 85 determines that the temperature of the water mixture is in the normal state (step 510), that is, when the temperature of the water mixture reaches the set temperature or is lowered after increased (the temperature deviation is negative), the energization-amount determining section 87 is again switched to the second control data storing section 83 so as to obtain the energization amount to the mixing device 17 using the data of the second control data storing section 83 (steps 511, 512).

With the above-mentioned arrangement with the opening-degree limiting function, the mixing device 17 is not operated to the full-opening state but controlled to an appropriate opening degree (limit value), and therefore it is possible to quickly adjust the temperature of the water mixture irrespective of rapid variation of the temperature of the hot water after absence of the temperature-lowered hot water.

Figure 23:
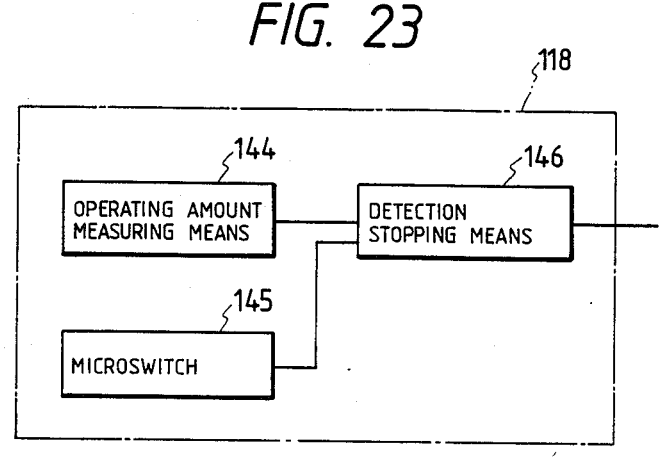
FIG. 23 shows a modification of the opening degree detecting arrangement.

FIG. 23 shows modification of the opening-degree detector 118. That is, an operating amount measuring means 144 measures the operating amount of the driving device of the mixing valve assembly 25' by counting the number of pulses if the driving device is constructed of a stepping motor, for example. When a microswitch 145 is operated, that is, when the hot-water side or cold-water side flow-rate adjusting valves 34, 35 reaches the fully closed position, a detection stopping means 146 stops the measurement of the operating amount thereof.

Figure 24:
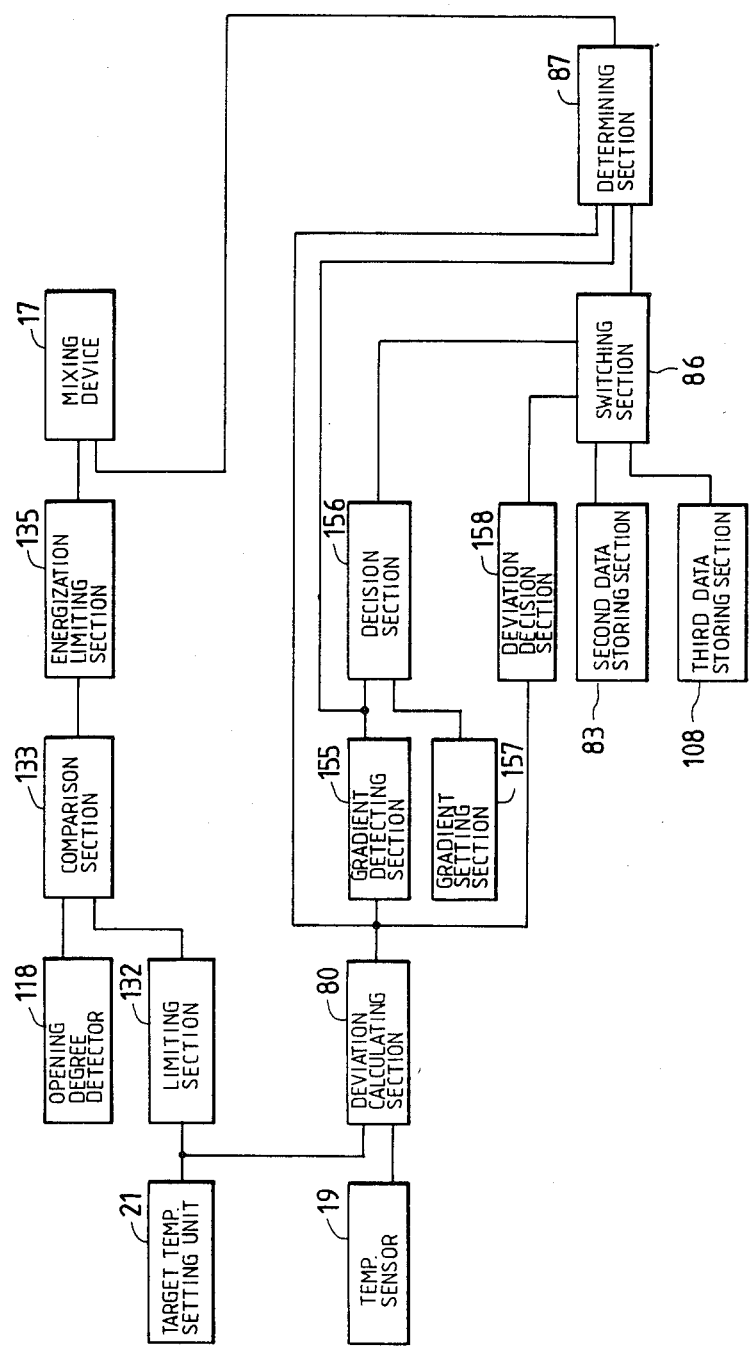
FIG. 24 is a block diagram showing an arrangement of the control unit of FIG. 1.

FIG. 24 is a block diagram showing a modification of the arrangement of the control unit 22 shown in FIG. 21, in the case that the temperature of the hot water is lowered to the vicinity of the set temperature and then increased up to the normal temperature. In FIG. 24, an opening-degree limiting section 132 sets an opening-degree limit value in accordance with the temperature set in the target temperature setting unit 21. The opening-degree limit value is compared in an opening-degree comparison section 133 with an opening degree (operating amount) of the mixing valve assembly 25' detected by the opening-degree detector 118. The opening-degree comparison section 133 checks, in accordance with the comparison therebetween, whether the opening degree of the mixing valve assembly 25' reaches the limit value. In response to reaching the limit value, an energization-amount limiting section 135 stops the operation of the mixing valve assembly 25'. A deviation calculating section 80 is responsive to the output signals of the target temperature setting unit 21 and the temperature sensor 19 so as to obtain the temperature deviation. A signal indicative of the obtained temperature deviation is inputted into a gradient detecting section 155 for obtaining the gradient of variation of the temperature deviation. The gradient detecting section 155 is coupled to a gradient decision section 156 which in turn compares the obtained gradient of variation of the temperature deviation with a gradient value set in a gradient setting section 157 so as to check whether the gradient of variation of the temperature deviation becomes above the set gradient value. A deviation decision section 158 is responsive to the output signal of the deviation calculating section 80 in order to check whether the temperature deviation becomes smaller than a predetermined deviation valve, that is, whether the temperature of the water mixture becomes higher than the set temperature. The gradient decision section 156 and the deviation section 158 are respectively coupled to a switching section 86 so that, in response to detection of the fact that the temperature of the water mixture becomes higher than the set temperature due to rapid variation of the temperature of the hot water which detection is made on the basis of the magnitude of the temperature deviation and the gradient of variation thereof, the switching section 86 is operated to cause an energization-amount determining section 87 to be switched in coupling from a second control data storing section 83 to a third control data storing section 108. The second control data storing section 83 stores a control rule representing the relation between the temperature deviation in the normal state and the energization amount of the mixing device 17 and the third control data storing section 108 stores a control rule representing the relation between the temperature deviation in the rapidly varying state and the corresponding energization amount of the mixing device 17 whereby the energization amount is larger in order to allow to quickly drive the mixing device 17. If required, it is possible to arrange the third control data storing section 108 so as to be the same as the above-mentioned first control data storing section 82.

Figure 25:
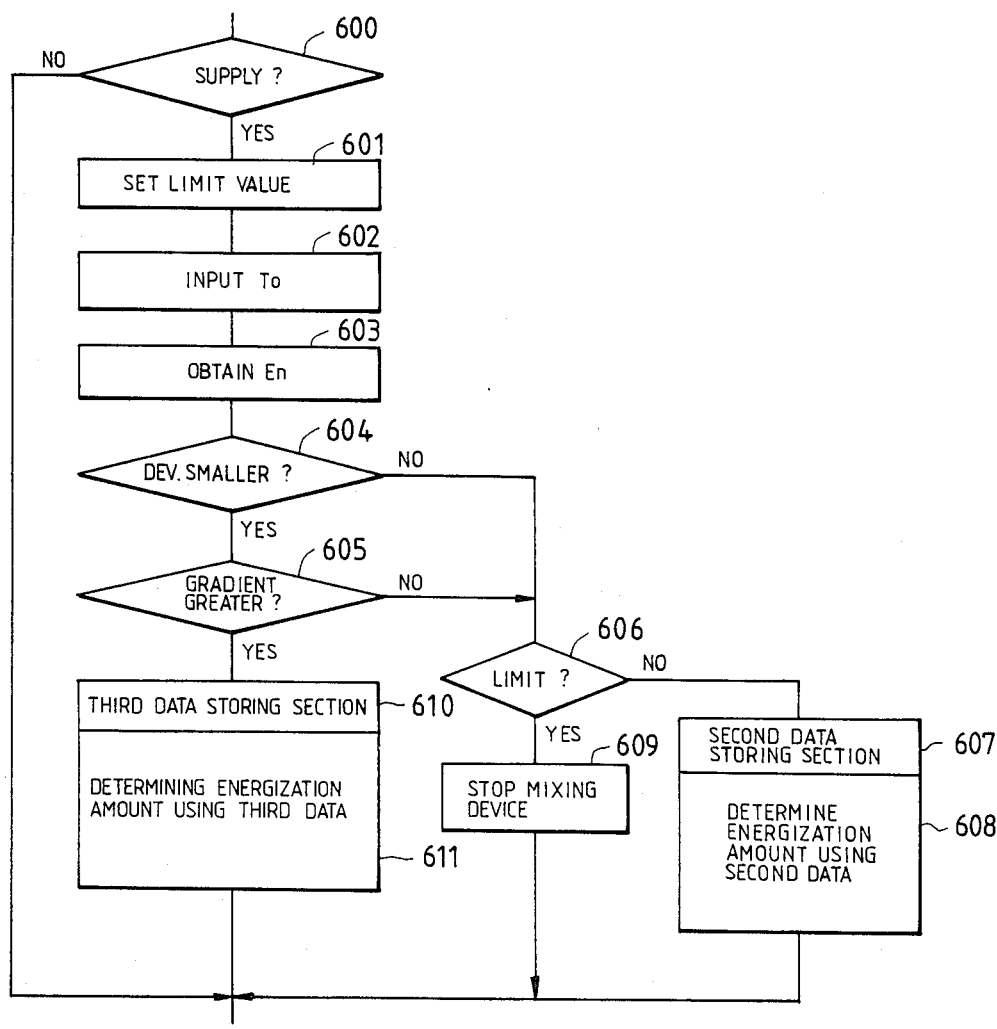
FIG. 25 is a flow chart for describing the operation of the FIG. 24 control unit.

FIG. 25 is a flow chart for a better understanding of the FIG. 24 control arrangement. In FIG. 25, in response to starting (step 600), the opening-degree limiting section 132 sets an opening-degree limit value Lo in accordance with the temperature set in the target temperature setting unit 21 (ste 601) and the temperature To of the water mixture is inputted from the temperature sensor 19 into the deviation calculating section 80 in order to obtain the temperature deviation En (steps 602, 603). It is checked whether the magnitude of the temperature deviation En is smaller than a predetermined value and the variation gradient thereof is greater than a predetermined value irrespective of the set temperature being not changed (steps 604, 605). If not, the switching section 86 causes the energization-amount determining section 87 to be coupled to the second control data storing section 83 under the condition that the operating amount of the mixing device 17 does not reach the set limit value Lo (steps 606, 607, 608). Here, when the operating amount of the mixing device 17 reaches the set limit value, the operation of the mixing device 17 is stopped as it is. On the other hand, If so in the steps 604 and 604, the switching section 86 causes the energization-amount determining section 87 to be coupled to the third control data storing section 108 so as to obtain the energization amount to the mixing device 17 using the data of the third control data storing section 108 (steps 610, 611).

Figure 27:
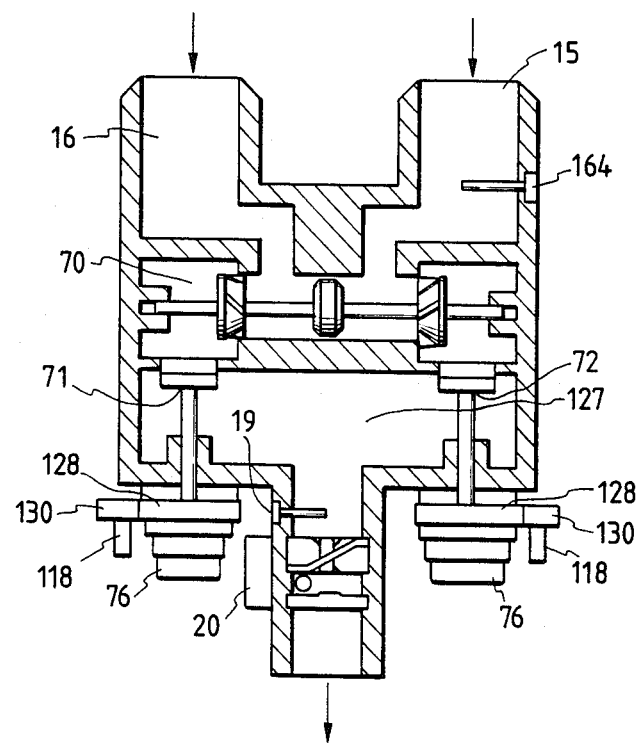
FIG. 27 illustrates a still further arrangement of the mixing device.
Figure 26:
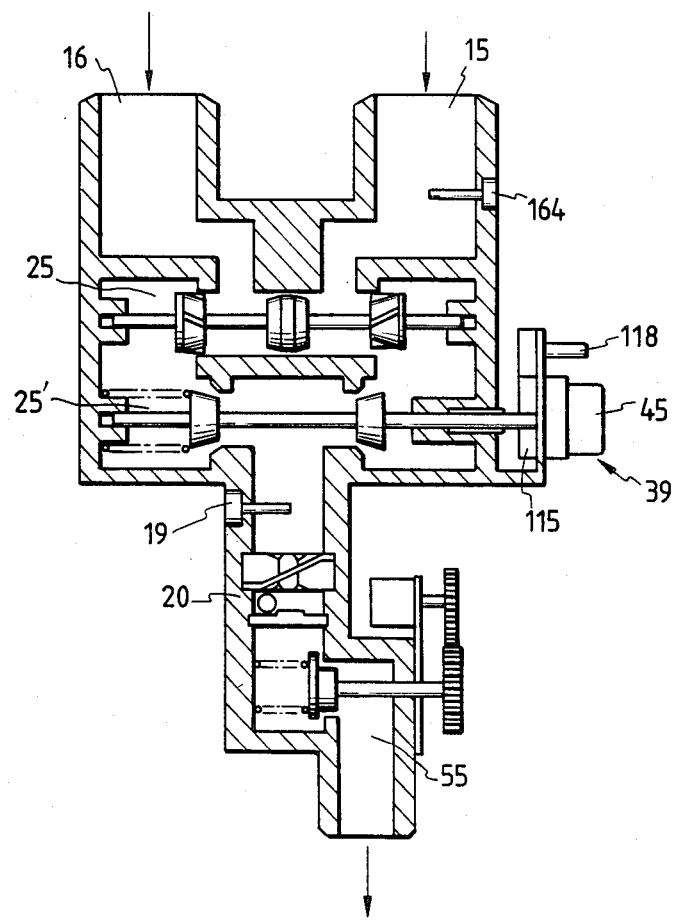
FIG. 26 shows a further arrangement of the mixing device.

Still further embodiments of the present invention will be described hereinbelow with reference to FIGS. 26 through 29. FIGS. 26 and 27 show further arrangements of the mixing device 17, in which parts corresponding to those in the above-mentioned embodiments are marked with the same numerals and the description thereof will be omitted for brevity. A feature of the mixing devices 17 of FIGS. 26 and 27 with respect to the FIGS. 18 and 20 mixing devices 17 is that a cold-water temperature sensor 164 is provided therein so as to measure the temperature of the cold water supplied through the cold-water supply passage 15.

Figure 28:
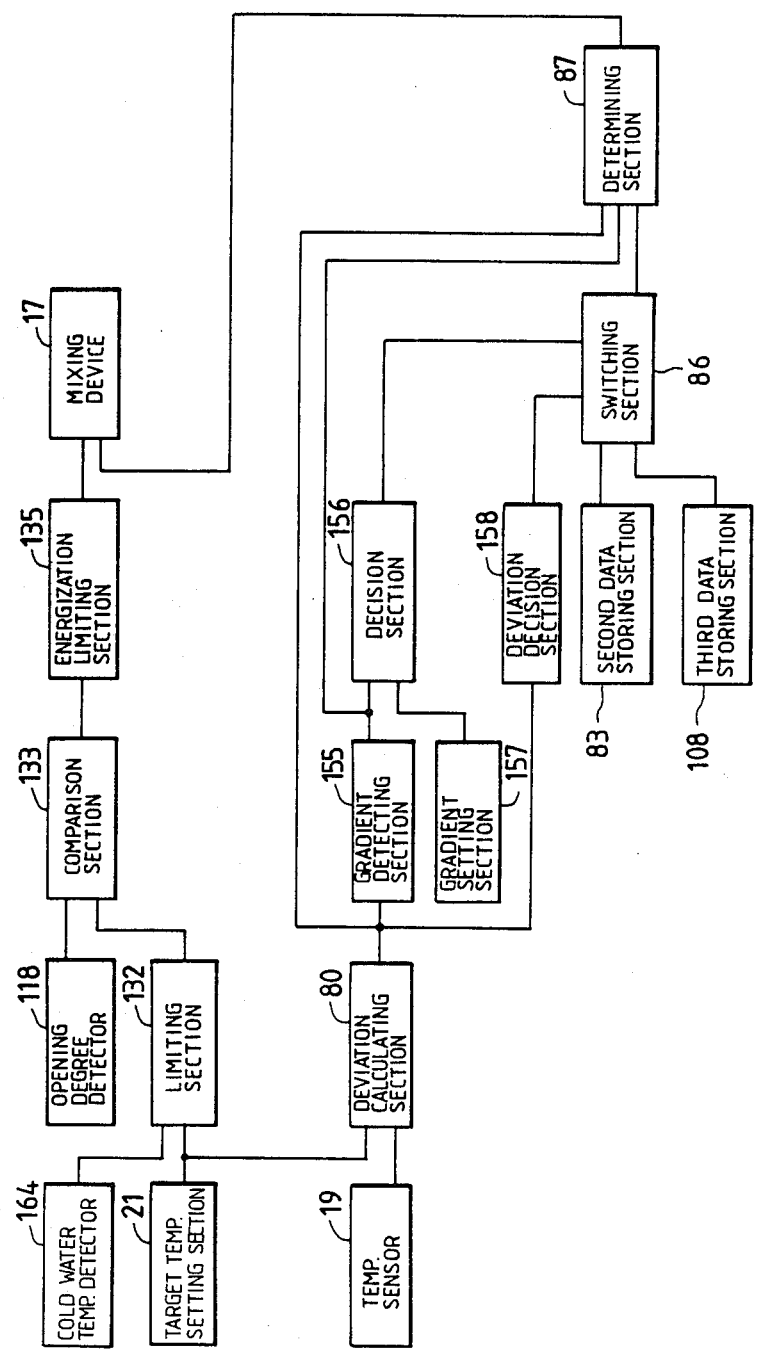
FIG. 28 is a block diagram showing an arrangement of the FIG. 1 control unit.
Figure 29:
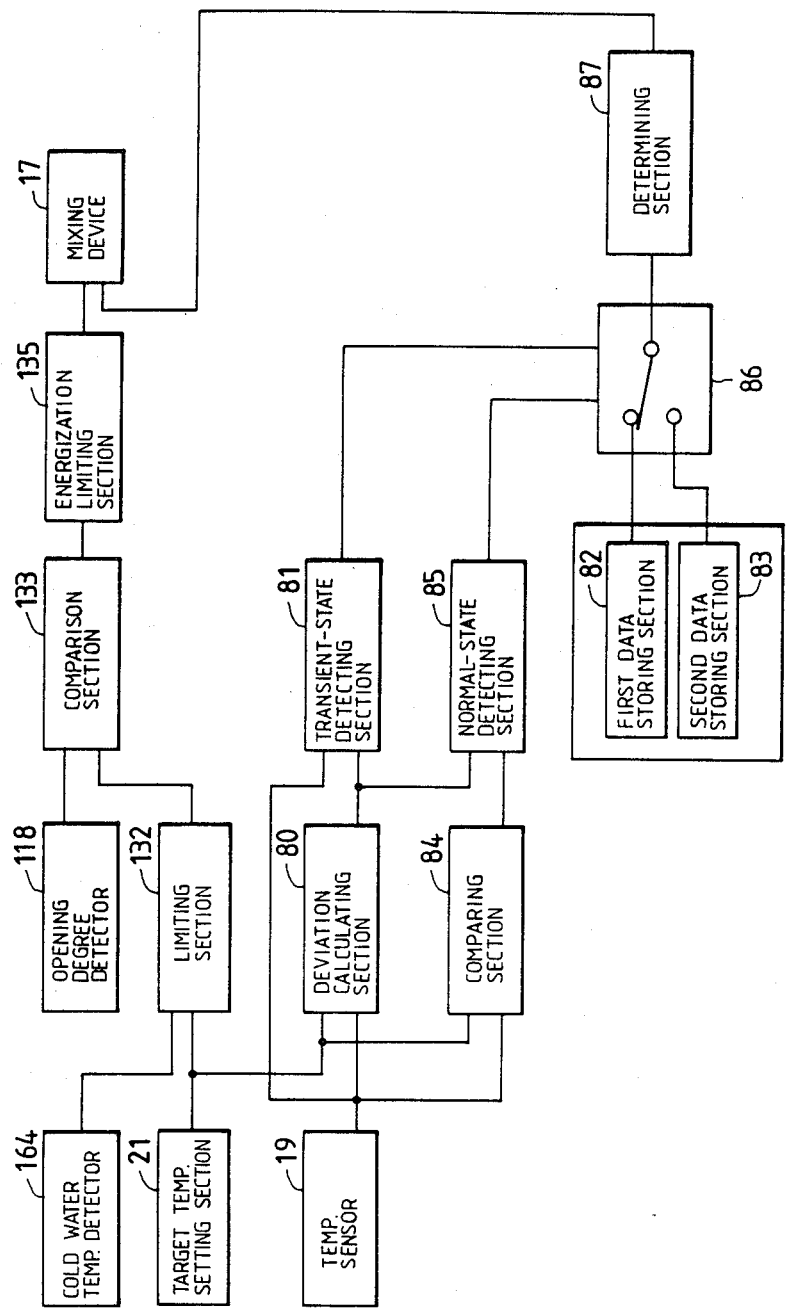
FIG. 29 is a block diagram showing an arrangement of the FIG. 1 control unit.

FIGS. 28 and 29 are illustration of arrangements and operations of the control unit 22 in connection with the FIGS. 26 and 27 mixing devices 17.

An important feature of each of the arrangements of FIGS. 28, 29 with respect to each of the above-described arrangements of FIGS. 24, 21 is that the opening degree limit value is determined in the opening-degree limiting section 132 on the basis of the set temperature and further the temperature of the cold water detected by means of the cold-water temperature sensor 164. That is, the opening-degree limit value becomes greater as the temperature of the cold water becomes higher, thereby resulting in the operable range of the mixing valve becoming narrower and the opening degree of the hot-water side valve becoming smaller. This allows quickly control of the mixing valve to the set-temperature-obtaining position in response to completion of flow-out of the temperature-lowered hot water and hence allows stable supply of appropriately temperature-adjusted water without overshooting.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example it is also appropriate to determine the opening-degree limit value in accordance with both the temperatures of the hot water and cold water.

What is claimed is:

1. A temperature-adjustable water supply system for supplying water at a predetermined temperature to a water outlet, comprising:

mixing means coupled to a hot water supply passage and a cold water supply passage for respectively introducing hot water and could water thereunto and coupled to a water mixture supply passage for supplying the mixture of the hot water and the cold water toward said water outlet, said mixing means including flow rate adjusting valve means for respectively adjusting the flow rates of the hot water and the cold water discharged into said water mixture supply passage, the temperature of the mixture of the hot water and the cold water depending upon the ratio of the flow rates of the hot water and the cold water to be discharged thereinto and said flow rate adjusting valve means being operable in accordance with a control signal so as to change the ratio of the flow rates of the hot water and the cold water to be discharged thereinto;

temperature sensor means provided in said water mixture supply passage so as to sense the temperature of the mixture of hot water and the cold water and generate a signal indicative of the sensed mixture temperature;

temperature setting means for setting a target temperature suitable for the purpose of said water outlet and generating a signal indicative of the set target temperature; and a control unit responsive to said mixture temperature signal from said temperature sensor means and said target temperature signal from said temperature setting means, said control unit comprising:

deviation calculating means coupled to said temperature sensor means and said temperature setting means for calculating a temperature deviation on the basis of said sensed temperature of the mixture and said set target temperature;

transient-state detecting means coupled to said deviation calculating means and said temperature sensor means so as to detect a predetermined condition of the mixture on the basis of the calculated temperature deviation and the sensed mixture temperature and generate a switching signal indicative of said predetermined condition;

first control data storing means for storing control data used for determining a control amount to said flow rate adjusting valve means of said mixing means on the basis of the calculated temperature deviation; and valve control means responsive to said switching signal from said transient-state detecting means for determining said control amount to said flow rate adjusting valve means on the basis of the control data corresponding to the calculated temperature deviation and outputting said control signal indicative of said determined control amount so as to control the flow rates of the hot water and the cold water to be discharged into said water mixture supply passage.

2. A temperature-adjustable water supply system as claimed in claim 1, wherein said control unit further includes:

comparing means coupled to said temperature sensor means and said temperature setting means for performing a comparison between the sensed mixture temperature and said set target temperature;

second control data storing means for storing second control data different from the first control data and used for determining said control amount to said flow rate adjusting valve means of said mixing means on the basis of the calculated temperature deviation; and normal-state detecting means coupled to said deviation calculating means and said comparing means so as to detect a second predetermined condition of the mixture on the basis of the calculated temperature deviation and the result of comparison of said comparing means to generate a second switching signal indicative of said second predetermined condition, wherein said valve control means is responsive to said second switching signal from said normal-state detecting means for determining said control amount to said flow rate adjusting valve means on the basis of the second control data corresponding to the calculated temperature deviation.

3. A temperature-adjustable water supply system as claimed in claim 1, further comprising flow-rate measuring means for measuring the flow rate of the mixture of the hot water and the cold water flowing through said water mixture supply passage, and wherein said valve control means corrects the determined control amount on the basis of the flow rate of the mixture measured by said flow-rate measuring means.

4. A temperature-adjustable water supply system for supplying water at a predetermined temperature to a water outlet, comprising:

mixing means coupled to a hot water supply passage and a cold water supply passage for respectively introducing hot water and cold water thereunto and coupled to a water mixture supply passage for supplying the mixture of the hot water and the cold water toward said water outlet, said mixing means including flow rate adjusting valve means for respectively adjusting the flow rates of the hot water and the cold water discharged into said water mixture supply passage, the temperature of the mixture of the hot water and the cold water depending upon the ratio of the flow rates of the hot water and the cold water to be discharged thereinto and said flow rate adjusting valve means being operable in accordance with a control signal so as to change the ratio of the flow rates of the hot water and the cold water to be discharged thereinto;

temperature sensor means provided in said water mixture supply passage so as to sense the temperature of the mixture of hot water and the cold water and generate a signal indicative of the sensed mixture temperature;

temperature setting means for setting a target temperature suitable for the purpose of said water outlet and generating a signal indicative of the set target temperature; and a control unit responsive to said mixture temperature signal from said temperature sensor means and said target temperature signal from said temperature setting means, said control unit comprising:

deviation calculating means for calculating a temperature deviation on the basis of said temperature of the mixture sensed by said temperature sensor means and said target temperature set by said temperature setting means;

comparing means for performing comparison between said sensed mixture temperature and said set target temperature; and valve control means for determining a control amount to said flow rate adjusting valve means on the basis of the temperature deviation calculated by said deviation calculating means and the relation in magnitude between said sensed mixture temperature and said set target temperature obtained by said comparing means and outputting said control signal indicative of said determined control amount to said mixing means so as to control the flow rates of the hot water and the cold water to be discharged into said water mixture supply passage, said valve control means includes first control data storing means and second control data storing means which both respectively store control data used for determining said control amount on the basis of the calculated temperature deviation and further includes normal-state detecting means coupled to said deviation calculating means so as to detect a first state in which the calculated temperature deviation is in a first predetermined range, said valve control means determining said control amount thereto using said control data stored in said first control data storing means in response to the detection of said first state so that said flow rate adjusting valve means is operated with a predetermined energization gain, said valve control means including transient-state detecting means coupled to said deviation calculating means so as to detect a second state in which variation of the calculated temperature deviations is coincident with a predetermined condition, said valve control means determining said control amount thereto using said control data stored in said second control data storing means in response to the detecting of said second state so that the flow rate adjusting valve means is operated with an energization gain greater than said predetermined energization gain, said normal-state detecting means being further coupled to said comparing means so as to detect a third state in which the sensed mixture temperature is below a predetermined valve determined with respect to said set target temperature, said valve control means also determining said control amount thereto using said control data of said first control data storing means in response to the detection of said third state.

5. A temperature-adjustable water supply system for supplying water at a predetermined temperature to a water outlet, comprising:

mixing means coupled to a hot water supply passage and a cold water supply passage for respectively introducing hot water and cold thereunto and coupled to a water mixture supply passage for supplying the mixture of the hot water and the cold water toward said water outlet, said mixing means including flow rate adjusting valve means for respectively adjusting the flow rates of the hot water and the cold water discharged into said water mixture suddly passage, the temperature of the mixture of the hot water and the cold water depending upon the ratio of the flood rates of the hot water and the cold water to be discharged thereinto and said flow rate adjusting valve means being operable in accordance with a control signal so as to change the ratio of the flow rates of the hot water and the cold water to be discharged thereinto;

temperature sensor means provided in said water mixture supply passage so as to sense the temperature of the mixture of hot water and the cold water and generate a signal indicative of the sensed mixture temperature;

cold water temperature detecting means for detecting a temperature of the cold water introduced through said cold-water supply passage into said mixing means;

temperature setting means for setting a target temperature suitable for the purpose of said water outlet and generating a signal indicative of the set target temperature; and a control unit responsive to said mixture temperature signal from said temperature sensor means and said target temperature signal from said temperature setting means, said control unit comprising:

deviation calculating means for calculating a temperature deviation on the basis of said sensed temperature for the mixture sensed by said temperature sensor means and said set target temperature set by said temperature setting means;

comparing means for performing comparison between said sensed mixture temperature and said target temperature;

hot-water temperature estimating means for estimating a temperature of the hot water supplied through said hot water supply passage to said mixing means in accordance with predetermined hot-water temperature data;

mixture-ratio calculating means coupled to said hot-water temperature estimation means, said temperature setting means and said cold-water temperature detecting means for calculating a mixture ratio of the hot water and the cold water on the basis of the detected cold water temperature, the estimated hot water temperature and the set target temperature; and valve control means for determining a control amount to said flow rate adjusting valve means on the basis of the temperature deviation calculated by said deviation calculating means and the relation in magnitude between said sensed mixture temperature and said set target temperature obtained by said comparing means and the mixture ratio calculated by said mixture-ratio calculating means, and said valve control means outputting said control signal indicative of said determined control amount to said mixing means so as to control the flow rates of the hot water and the cold dater to be discharged into said water mixture supply passage.

6. A temperature-adjustable water supply system as claimed in claim 5, wherein said control unit further includes mixture-ratio correction means coupled to said mixture-ratio calculating means and said deviation calculating means so as to correct the calculated mixture ratio on the basis of the calculated temperature deviation, said valve control means determines said control amount on the basis of the corrected mixture ratio.

7. A temperature-adjustable water supply system for supplying water at a predetermined temperature to a water outlet, comprising:

mixing means coupled to shot water supply passage and a cold water supply passage for respectively introducing hot water and cold water thereunto and coupled to a water mixture supply passage for supplying the mixture of the hot water and the cold water toward said water outlet, said mixing means including flow rate adjusting valve means for respectively adjusting the flow rates of the hot water and the cold water discharged into said water mixture supply passage, the temperature of the mixture of the hot water and the cold water depending upon the ratio of the flow rates of the hot water and the cold water to be discharged thereinto and said flow rate adjusting valve means being operable in accordance with a control signal so as to change the ratio of the flood rates of the hot water and the cold water to be discharged thereinto;

temperature sensor means provided in said water mixture supply passage so as to sense the temperature of the mixture of the hot water and the cold water and generate a signal indicative of the sensed mixture temperature;

operation amount detecting means for detecting an operation amount of said flow-rate adjusting valve means and outputting a signal indicative of the detected operation amount temperature setting means for setting a target temperature suitable for the purpose of said water outlet and generating a signal indicative of the set target temperature; and a control unit responsive to said mixture temperature signal from said temperature sensor means and said target temperature signal from said temperature setting means, said control unit comprising:

deviation calculating means for calculating a temperature deviation on the basis of said sensed temperature for the mixture sensed by said temperature sensor means and said target temperature set by said temperature setting means;

comparing means for performing comparison between said sensed mixture temperature and said target temperature;

limit setting means for setting a limit value of the operation of said flow rate adjusting valve means;

operation amount comparison means responsive to the operation amount indicating signal from said operation amount detecting means and coupled to said limit setting means so as to compare the detected operation amount with the limit value; and valve control means for determining a control amount to said flow rate adjusting valve means on the basis of the temperature deviation calculated by said deviation calculating means and the relation in magnitude between said sensed mixture temperature and said set target temperature obtained by said comparing means, and said valve control means outputting said control signal indicative of said determined control amount to said mixing means so as to control the flow rates of the hot water and the cold water to be discharged into said water mixture supply passage, said valve control means stopping the operation of said flow-rate adjusting valve means when said detected operation amount has reached said limit value.

8. A temperature-adjustable water supply system as claimed in claim 7, wherein said limit setting means is coupled to said temperature setting means so that said limit value is varied in accordance with the set target temperature.

9. A temperature-adjustable water supply system as claimed in claim 7, further comprising water temperature detecting deans for detecting a temperature of either the cold water or the hot water introduced through said cold water supply passage or said hot water supply passage and generates a signal indicative of the detected water temperature, and wherein said limit setting means is responsive to the water temperature signal so as to set said limit value in accordance with the detected water temperature and the set target temperature.

10. A temperature-adjustable water supply system for supplying water at a predetermined temperature to a water outlet, comprising:
mixing means coupled to a hot water supply passage and a cold water supply passage for respectively introducing hot water and cold water thereunto and coupled to a water mixture supply passage for supplying the mixture of the hot water and the cold water toward said water outlet, said mixing means including flow rate adjusting valve means for respectively adjusting the flow rates of the hot water and the cold water discharged into said dater mixture supply passage, the temperature of the mixture of the hot water and the cold water depending upon the ratio of the flow rates of the hot water and the cold water to be discharged thereinto and said flow rate adjusting valve means being operable in accordance with a control signal so as to change the ratio of the flow rates of the hot water and the cold water to be discharged thereinto;
temperature sensor means provided in said water mixture supply passage so as to sense the temperature of the mixture of hot water and the cold water and generate a signal indicative of the sensed mixture temperature;
temperature setting means for setting a target temperature suitable for the purpose of said water outlet and generating a signal indicative of the set target temperature; and
a control unit responsive to said mixture temperature signal from said temperature sensor means and said target temperature signal from said temperature setting means, said control unit comprising:
deviation calculating means for calculating a temperature deviation on the basis of said sensed temperature for the mixture sensed by said temperature sensor means and said target temperature set by said temperature setting means;
gradient detecting means coupled to said deviation calculating means for detecting the gradient of variation of the calculated temperature deviations; and
valve control means for determining a control amount to said flow rate adjusting valve means on the basis of the detected gradient of variation of the calculated temperature deviation and outputting said control signal indicative of said determined control amount to said mixing means so as to control the flow rates of the hot water and the cold water to be discharged into said water mixture supply passage.

11. A temperature-adjustable water supply system as claimed in claim 10, wherein said valve control means includes first control data storing means and second control data storing means which respectively store control data used for determining said control amount on the basis of the calculated temperature deviation whereby the energization gain of said flow-rate adjusting valve means is varied.

12. A temperature-adjustable water supply system as claimed in claim 11, wherein said valve control means includes gradient decision means coupled to said gradient detecting means to compare the detected variation gradient with a predetermined gradient, said valve control means determines said control amount thereto using said control data stored in said first control data storing means when the detected variation gradient is smaller than said predetermined gradient value.

13. A temperature-adjustable water supply system for supplying water at a predetermined temperature to a water outlet, comprising:
mixing means coupled to a hot water supply passage and a cold water supply passage for respectively introducing hot water and cold water thereunto and coupled to a water mixture supply passage for supplying the mixture of the hot water and the cold water toward said water outlet, said mixing means including flow rate adjusting valve means for respectively adjusting the flow rates of the hot water and the cold water discharged into said water mixture supply passage, the temperature of the mixture of the hot water and the cold water depending upon the ratio of the flow rates of the hot water and the cold water to be discharged thereinto and said flow rate adjusting valve means being operable in accordance with a control signal so as to change the ratio of the flow rates of the hot water and the cold water to be discharged thereinto;
temperature sensor means provided in said water mixture supply passage so as to sense the temperature of the mixture of hot water and the cold water and generate a signal indicative of the sensed mixture temperature;
temperature setting means for setting a target temperature suitable for the purpose of said water outlet and generating a signal indicative of the set target temperature; and
a control unit responsive to said mixture temperature signal from said temperature sensor means and said target temperature signal from said temperature setting means, said control unit comprising;
deviation calculating means for calculating a temperature deviation on the basis of said temperature of the mixture sensed by said temperature sensor means and said target temperature set by said temperature setting means;
gradient detecting means coupled to said deviation calculating means for detecting the gradient of variation of the calculated temperature deviations; and valve control means for determining a control amount to said flow rate adjusting valve means on the basis of the detected gradient of variation of the calculated temperature deviation and outputting said control signal indicative of said determined control amount to said mixing means so as to control the flow rates of the hot water and cold water to be discharged into said water mixture supply passage, said valve control means including first control data storing means and second control data storing means both which respectively store control data used for determining said control amount whereby the energization gain of said flow-rate adjusting valve means coupled to said gradient detecting means to compare the detected variation gradient with a predetermined gradient, said valve control means determining said control amount thereto using said control data stored in said first control data storing means when the detected variation gradient is smaller than said predetermined gradient value, and said valve control means including deviation decision means coupled to said deviation calculating means so as to compare the calculated temperature deviation with a predetermined deviation value, said valve control means determining said control amount thereto using said control data stored in said first control data storing means when the calculated temperature deviation is greater than said predetermined deviation value and determining said control amount thereto using said control data stored in said second control data storing means when the detected variation gradient is greater than said predetermined gradient value and the calculated temperature deviation is smaller than said predetermined deviation value.

14. A temperature-adjustable water supply system for supplying water at a predetermined temperature to a water outlet, comprising:

mixing means coupled to a hot water supply passage and a cold water supply passage for respectively introducing hot water and cold water thereunto and coupled to a water mixture supply passage for supplying the mixture of the hot water and the cold water toward said water outlet, said mixing means including flow rate adjusting valve means for respectively adjusting the flow rates of the hot water and the cold water discharged into said water mixture supply passage, the temperature of the mixture of the hot water and the cold water depending upon the ratio of the flow rates of the hot water and the cold water to be discharged thereinto and said flow rate adjusting valve means being operable in accordance with a control signal so as to change the ratio of the flow rates of the hot water and the cold water to be discharged thereinto;

temperature sensor means provided in said water mixture supply passage so as to sense the temperature of the mixture of hot water and the cold water and generate a signal indicative of the sensed mixture temperature;

flow-rate measuring means for measuring the flow rate of the mixture of the hot water and the cold water flowing through said water mixture supply passage;

temperature setting means for setting a target temperature suitable for the purpose of said water outlet and generating a signal indicative of the set target temperature; ant a control unit responsive to said mixture temperature signal from said temperature sensor means and said target temperature signal from said temperature setting means, said control unit comprising:

deviation calculating means for calculating a temperature deviation on the basis of said temperature of the mixture sensed by said temperature sensor means and said target temperature set by said temperature setting means;

gradient detecting means coupled to said deviation calculating means for detecting the gradient of variation of the calculated temperature deviations; and valve control means for determining a control amount to said flow rate adjusting valve means on the basis of the detected gradient of variation of the calculated temperature deviation and outputting said control signal indicative of said determined control amount to said mixing means so as to control the flow rates of the hot water and the cold water to be discharged into said water mixture supply passage, said valve control means correcting the determined control amount on the basis of the flow rate of the mixture measured by said flow-rate measuring means.

15. A temperature-adjustable water supply system for supplying water at a predetermined temperature to a water outlet, comprising:

mixing means coupled to a hot water supply passage and a cold water supply passage for respectively introducing hot water and cold water thereunto and coupled to a water mixture supply passage for supplying the mixture of the hot water and the cold water toward said water outlet, said mixing means including flow rate adjusting valve means for respectively adjusting the flow rates of the hot water and the cold water discharged into said water mixture supply passage, the temperature of the mixture of the hot water and the cold water depending upon the ratio of the flow rates of the hot water ant the colt water to be discharged thereinto and said flow rate adjusting valve means being operable in accordance with a control signal so as to change the ratio of the flow rates of the hot water and the cold water to be discharged thereinto;

temperature sensor means provided in salt water mixture supply passage so as to sense the temperature of the mixture of hot water and the colt water ant generate a signal indicative of the sensed mixture temperature;

operation amount detecting means for detecting an operation amount of said flow-rate adjusting valve means and outputting a signal indicative of the detected operation amount;

temperature setting means for setting a target temperature suitable for the purpose of said water outlet and generating a signal indicative of the set target temperature; and a control unit responsive to salt mixture temperature signal from said temperature sensor means and said target temperature signal from said temperature setting means, said control unit comprising:

deviation calculating means for calculating a temperature deviation on the basis of said temperature of the mixture sensed by said temperature sensor means and said target temperature set by said temperature setting means;

gradient detecting means coupled to said deviation calculating means for detecting the gradient of variation of the calculated temperature deviations; and limit setting means for setting a limit value of the operation of said flow rate adjusting valve means;

operation amount comparison means, responsive to the operation amount indicating signal from said operation amount detecting means and coupled to said limit setting means so as to compare the detected operation amount with the set limit value; and valve control means for determining a control amount to said flow rate adjusting valve means on the basis of the detected gradient of variation of the calculated temperature deviation and outputting said control signal indicative of said determine control amount to said mixing means so as to control the flow rates of the hot water and the cold water to be discharged into said water mixture supply passage, said valve control means stopping the operation of said flow-rate adjusting valve means when said detected operation amount has reached said limit value.

16. A temperature-adjustable water supply system as claimed in claim 15, wherein said limit supply setting means is coupled to said temperature setting means so that said limit value is variety in accordance with the set target temperature.

17. A temperature-adjustable water supply system as claimed in claim 15, further comprising water temperature detecting means for detecting a temperature of either the cold water or the hot water introduced through said cold water supply passage or said hot water supply passage and generates a signal indicative of the detected water temperature, and wherein said limit setting means is responsive to the water temperature signal so as to set said limit value in accordance with the detected water temperature and the set target temperature.

* * * * *